United States Patent
Hosono et al.

(10) Patent No.: US 6,858,860 B2
(45) Date of Patent: Feb. 22, 2005

(54) APPARATUS AND METHOD FOR MEASURING NATURAL PERIOD OF LIQUID

(75) Inventors: Satoru Hosono, Nagano (JP);
Hirofumi Teramae, Nagano (JP);
Hironori Endo, Nagano (JP)

(73) Assignee: Seiko Epson Corporation, Tokyo (JP)

(*) Notice: Subject to any disclaimer, the term of this patent is extended or adjusted under 35 U.S.C. 154(b) by 84 days.

(21) Appl. No.: 10/200,584

(22) Filed: Jul. 23, 2002

(65) Prior Publication Data

US 2003/0085343 A1 May 8, 2003

(51) Int. Cl.$^7$ ................................................. G01N 21/85
(52) U.S. Cl. ..................... 250/573; 250/576; 347/19; 347/74; 347/81
(58) Field of Search ........................ 250/573, 574, 250/576; 347/19, 20, 74–81; 356/27, 28

(56) References Cited

U.S. PATENT DOCUMENTS

| | | | | |
|---|---|---|---|---|
| 4,509,057 A | * | 4/1985 | Sohl et al. ..................... | 347/19 |
| 5,353,052 A | * | 10/1994 | Suzuki et al. ................... | 347/19 |
| 6,102,512 A | * | 8/2000 | Torii et al. ..................... | 347/10 |
| 6,149,258 A | * | 11/2000 | Kimura ......................... | 347/10 |
| 6,227,643 B1 | * | 5/2001 | Purcell et al. .................. | 347/19 |
| 6,241,345 B1 | * | 6/2001 | Ushioda ........................ | 347/68 |
| 6,305,777 B1 | * | 10/2001 | Lee .............................. | 347/19 |
| 6,624,434 B1 | * | 9/2003 | Shen et al. .................... | 250/573 |

FOREIGN PATENT DOCUMENTS

| | | |
|---|---|---|
| JP | 7-132592 A | 5/1995 |
| JP | 9-277517 A | 10/1997 |
| JP | 10-157099 A | 6/1998 |
| JP | 2000-85140 A | 3/2000 |
| JP | 2000-272134 A | 10/2000 |
| JP | 2001-47619 A | 2/2001 |

* cited by examiner

*Primary Examiner*—Thanh X. Luu
*Assistant Examiner*—Stephen Yam
(74) *Attorney, Agent, or Firm*—Sughrue Mion, PLLC

(57) ABSTRACT

In an apparatus for measuring a natural period of liquid in a pressure chamber formed in a head device which is provided with a nozzle orifice communicated with the pressure chamber and an actuator which varies pressure of the liquid contained in the pressure chamber, a driver generates a plurality of drive signals, each of which drives the actuator to eject a liquid droplet from the nozzle orifice under a condition different from the conditions established by the other drive signals. A light emitter emits a light beam so as to intersect a space through which the liquid droplet passes. A light receiver receives the light beam which has been passed through the space. A first calculator calculates an ejection velocity of the liquid droplet based on a timing at which the actuator is driven and a change in a photo-receiving state of the light receiver, with regard to every drive signal. A second calculator calculates a natural period of the liquid based on a change in the ejection velocity which is obtained from the plural drive signals.

37 Claims, 17 Drawing Sheets

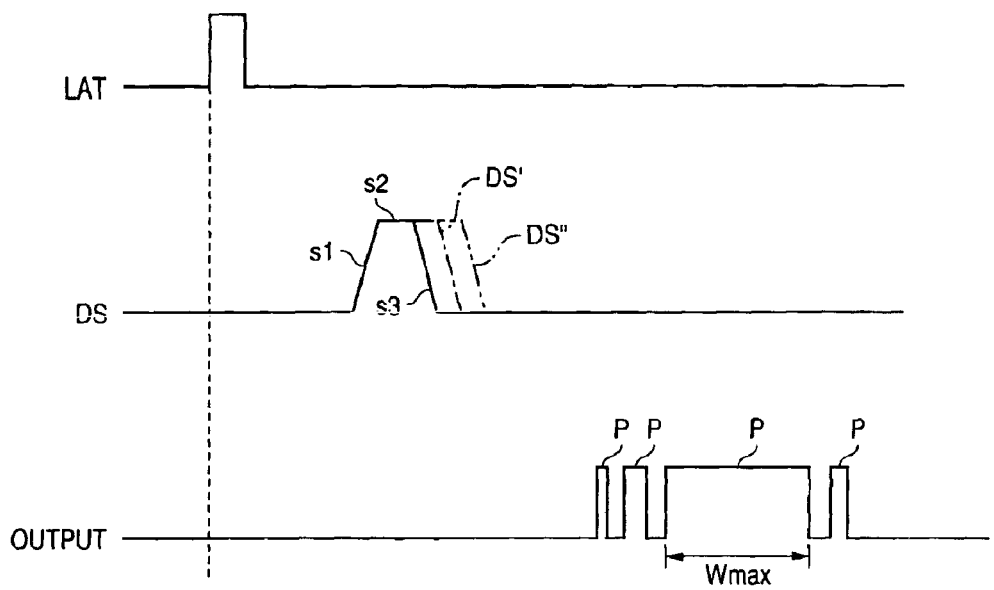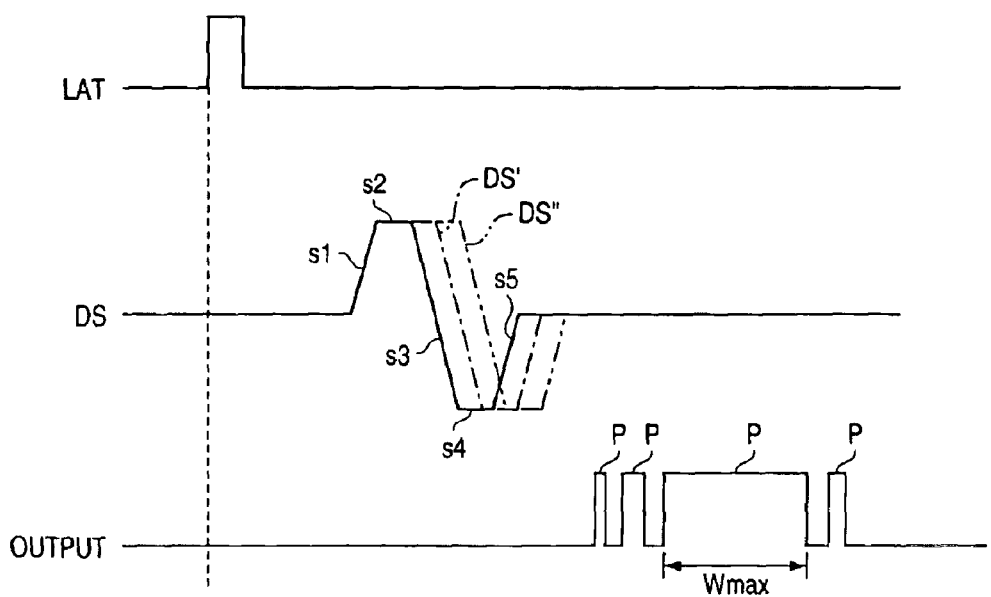

APPARATUS AND METHOD FOR MEASURING NATURAL PERIOD OF LIQUID

BACKGROUND OF THE INVENTION

The invention relates to an apparatus for measuring a natural period of liquid in a pressure generating chamber disposed in a head member, wherein the head member comprises a nozzle orifice communicated with the pressure generating chamber storing liquid; a liquid supply channel for supplying liquid to the pressure generating chamber; and a piezoelectric member which deforms the pressure generating chamber, to thereby cause the nozzle orifices to eject liquid droplets. Such a head member is employed in various applications.

For instance, a head member which ejects ink droplets as liquid droplets is used as a recording head of an ink jet recording apparatus for effecting recording on recording paper or the like.

Measurement of a natural period of liquid stored in the pressure generating chamber of such a head member is useful for more accurate control of ejection of liquid droplets.

However, there has not yet been realized an apparatus for measuring with sufficient accuracy the natural period of liquid stored in a pressure generating chamber.

SUMMARY OF THE INVENTION

It is therefore an object of the invention to provide a natural period measuring apparatus which measures a natural period of liquid stored in a pressure generating chamber with sufficiently high accuracy and at considerably high velocity.

In order to achieve the above object, according to the invention, there is provided an apparatus for measuring a natural period of liquid in a pressure chamber formed in a head device which is provided with a nozzle orifice communicated with the pressure chamber and an actuator which varies pressure of the liquid contained in the pressure chamber, the apparatus comprising:

a driver, which generates a plurality of drive signals, each of which drives the actuator to eject a liquid droplet from the nozzle orifice under a condition different from the conditions established by the other drive signals;

a light emitter, which emits a light beam so as to intersect a space through which the liquid droplet passes;

a light receiver, which receives the light beam which has been passed through the space;

a first calculator, which calculates an ejection velocity of the liquid droplet based on a timing at which the actuator is driven and a change in a photo-receiving state of the light receiver, with regard to every drive signal; and a second calculator, which calculates a natural period of the liquid based on a change in the ejection velocity which is obtained from the plural drive signals.

Preferably, the change in the photo-receiving state is so configured that a reception of the light beam in the light receiver is interrupted when the liquid droplets intersects the light beam.

Here, it is preferable that the light receiver generates a pulse signal having a pulse width corresponding to a time period during which the reception of the light beam is interrupted.

In this case, it is preferable that the first calculator calculates the ejection velocity based on the timing at which the actuator is driven and a timing of an initial edge of the pulse signal.

Alternatively, it is preferable that the first calculator calculates the ejection velocity based on the timing at which the actuator is driven and a timing of a center portion the pulse width.

Preferably, the apparatus further comprises a position adjuster, which adjusts a distance between the nozzle orifice and the light beam.

Here, it is preferable that the position adjuster provides a first distance and a second distance. The driver drives the actuator each of when the first distance is provided and when the second distance is provided. The first calculator calculates the ejection velocity based on a change in a photo-receiving state of the light receiver when the first distance is provided and a change in a photo-receiving state of the light receiver when the second distance is provided.

With such a configuration, even when a timing at which a liquid droplet is to be ejected cannot be ascertained accurately, the velocity of a liquid droplet can be measured with sufficiently high accuracy and sufficient durability.

Preferably, the apparatus further comprises a shutter disposed between the light emitter or the light receiver and the space to prevent liquid mist from going to the light emitter. With such a configuration, adhesion of ink mist to the light emitter or the light receiver can be avoided.

The light emitter is preferably a light source which has high directivity and for which a luminous flux is easily focused; for example, a semiconductor laser.

The light receiver is a light-receiving element having high-velocity response; for example, a photo-diode.

Preferably, the light emitter includes a first light emitter, which emits a first light beam so as to intersect a first space which is away from the nozzle orifice at a first distance, and a second light emitter, which emits a second light beam so as to intersect a second space which is away from the nozzle orifice at a second distance. The light receiver includes a first light receiver, which receives the first light beam which has been passed through the first space, and a second light receiver, which receives the second light beam which has been passed through the second space. The first calculator calculates the ejection velocity based on a change in a photo-receiving state of the first light receiver and a change in a photo-receiving state of the second light receiver.

With such a configuration, the velocity of a liquid droplet is derived on the basis of a light-receiving state of the first light receiver and a light-receiving state of the second light receiver. Hence, even when a timing at which a liquid droplet is to be ejected cannot be ascertained accurately, the velocity of a liquid droplet can be measured with sufficiently high accuracy and sufficient durability.

The liquid is, for example, ink containing a coloring material.

Preferably, the first calculator calculates the ejection velocity based on the pulse width of the pulse signal.

In this case, the velocity of a liquid droplet is measured by measuring the width of a pulse waveform which develops as a result of a liquid droplet passing an optical beam. Hence, the velocity of a liquid droplet can be measured accurately within a very short time period.

Here, the first calculator calculates the ejection velocity based on a pulse signal having the largest pulse width among pulse signals obtained within a predetermined time period.

Preferably, each of the drive signals has a first waveform element which decompresses the pressure chamber, a second waveform element which holds a decompressed state of the pressure chamber, and a third waveform element which compress the pressure chamber. Each condition is defined by varying a duration of the second waveform element.

Here, it is preferable that each condition is determined such that the change in the ejection velocity has at least two peak values.

In this case, it is preferable that the natural period is determined as a time period represented by an interval of the peak values.

Further, it is preferable that a duration of the first waveform element is a half of a natural period which is previously derived in connection with the liquid and the pressure chamber.

Still further, it is preferable that a duration of the third waveform element is a half of a natural period which is previously derived in connection with the liquid and the pressure chamber.

Preferably, the apparatus further comprising:

a comparator, which compares the natural period calculated by the second calculator with a natural period value which is previously derived in connection with the liquid and the pressure chamber; and a signal corrector, which corrects the respective drive signals, when a difference between the calculated natural period and the natural period value is greater than a predetermined value, so as to reduce the difference.

According to the invention, there is also provided an apparatus for measuring a natural period of liquid in a pressure chamber formed in a head device which is provided with a nozzle orifice communicated with the pressure chamber and an actuator which varies pressure of the liquid contained in the pressure chamber, the apparatus comprising:

a driver, which generates a plurality of drive signals, each of which drives the actuator to eject a liquid droplet from the nozzle orifice under a condition different from the conditions established by the other drive signals;

a light emitter, which emits a light beam so as to intersect a space through which the liquid droplet passes;

a light receiver, which receives the light beam which has been passed through the space;

a first calculator, which calculates a time period until the liquid droplet intersects the light beam since the liquid droplet is ejected, based on a timing at which the actuator is driven and a change in a photo-receiving state of the light receiver, with regard to every drive signal; and a second calculator, which calculates a natural period of the liquid droplet based on a change in the time period which is obtained from the plural drive signals.

Preferably, each condition is determined such that the change in the time period has at least two bottom values.

Here, it is preferable that the natural period is determined as a time period represented by an interval of the bottom values.

According to the invention, there is also provided an apparatus for measuring a natural period of liquid in a pressure chamber formed in a head device which is provided with a nozzle orifice communicated with the pressure chamber and an actuator which varies pressure of the liquid contained in the pressure chamber, the apparatus comprising:

a driver, which generates a plurality of drive signals, each of which drives the actuator to eject a liquid droplet from the nozzle orifice under a condition different from the conditions established by the other drive signals;

a light emitter, which emits a light beam so as to intersect a space through which the liquid droplet passes;

a light receiver, which receives the light beam which has been passed through the space;

a first calculator, which calculates a time period during which the liquid droplet intersects the light beam, with regard to every drive signal; and a second calculator, which calculates a natural period of the liquid droplet based on a change in the time period which is obtained from the plural drive signals.

Preferably, each condition is determined such that the change in the time period has at least two peak values.

Here, it is preferable that the natural period is determined as a time period represented by an interval of the peak values.

According to the invention, there is also provided a method of measuring a natural period of liquid in a pressure chamber formed in a head device, comprising the steps of:

providing a head device provided with a pressure chamber communicated with a nozzle orifice and an actuator which varies pressure of liquid contained in the pressure chamber;

providing a first light emitter and a first light receiver;

emitting a first light beam from the first light emitter so as to intersect a first space between the first light emitter and the first light receiver;

receiving the first light beam which has been passed through the first space by the first light receiver;

generating a plurality of drive signals, each of which drives the actuator to eject a liquid droplet from the nozzle orifice under a condition different from the conditions established by the other drive signals;

calculating an ejection velocity of the liquid droplet, with regard to every drive signal, based on a timing at which the actuator is driven and a change in a photo-receiving state of the first light receiver caused by the ejected liquid droplet passes through the first light beam; and calculating a natural period of the liquid droplet based on a change in the ejection velocity which is obtained from the plural drive signals.

Preferably, the method further comprises the step of generating a pulse signal having a pulse width corresponding to a time period during which the change in the photo-receiving state is occurred.

Here, it is preferable that the ejection velocity is calculated based on the timing at which the actuator is driven and a timing of an initial edge of the pulse signal.

Alternatively, it is preferable that the ejection velocity is calculated based on the timing at which the actuator is driven and a timing of a center portion of the pulse width.

Preferably, the method further comprises the steps of positioning the head device such that a distance between the nozzle orifice and the first light beam becomes a first distance and a second distance. The drive signal is generated both of when the distance is the first distance and when the distance is the second distance. The ejection velocity is calculated both of when the distance is the first distance and when the distance is the second distance.

Preferably, the method further comprises the steps of:

providing a second light emitter and a second light receiver;

emitting a second light beam from the second light emitter so as to intersect a second space between the second light emitter and the second light receiver; and receiving the second light beam which has been passed through the second space by the second light receiver.

The ejection velocity is calculated further based on a timing at which the actuator is driven and a change in a photo-receiving state of the second light receiver caused by the ejected liquid droplet passes through the second light beam.

Preferably, the ejection velocity is calculated based on the pulse width of the pulse signal.

Here, it is preferable that the method further comprises the step of selecting one pulse signal having the largest pulse width among pulse signals obtained within a predetermined time period. The ejection velocity is calculated based on the largest pulse width.

Preferably, each of the drive signals has a first waveform element which decompresses the pressure chamber, a second waveform element which holds a decompressed state of the pressure chamber, and a third waveform element which compress the pressure chamber. Each condition is defined by varying a duration of the second waveform element.

Here, it is preferable that each condition is determined such that the change in the ejection velocity has at least two peak values.

In this case, it is preferable that the natural period is determined as a time period represented by an interval of the peak values.

Further, it is preferable that a duration of the first waveform element is determined to be a half of a natural period which is previously derived in connection with the liquid and the pressure chamber.

Still further, it is preferable that a duration of the third waveform element is determined to be a half of a natural period which is previously derived in connection with the liquid and the pressure chamber.

Preferably, the method further comprises the steps of:

comparing the calculated natural period with a natural period value which is previously derived in connection with the liquid and the pressure chamber; and correcting the respective drive signals when a difference between the calculated natural period and the natural period value is greater than a predetermined value, so as to reduce the difference.

According to the invention, there is also provided a method of measuring a natural period of liquid in a pressure chamber formed in a head device, comprising the steps of:

providing a head device provided with a pressure chamber communicated with a nozzle orifice and an actuator which varies pressure of liquid contained in the pressure chamber;

providing a light emitter and a light receiver;

emitting a light beam from the light emitter so as to intersect a space between the light emitter and the light receiver;

receiving the light beam which has been passed through the space by the light receiver;

generating a plurality of drive signals, each of which drives the actuator to eject a liquid droplet from the nozzle orifice under a condition different from the conditions established by the other drive signals;

calculating a time period until the liquid droplet intersects the light beam since the liquid droplet is ejected, with regard to every drive signal, based on a timing at which the actuator is driven and a change in a photo-receiving state of the light receiver caused by the ejected liquid droplet passes through the light beam; and calculating a natural period of the liquid droplet based on a change in the time period which is obtained from the plural drive signals.

Preferably, each condition is determined such that the change in the time period has at least two bottom values.

In this case, it is preferable that the natural period is determined as a time period represented by an interval of the bottom values.

According to the invention, there is also provided a method of measuring a natural period of liquid in a pressure chamber formed in a head device, comprising the steps of:

providing a head device provided with a pressure chamber communicated with a nozzle orifice and an actuator which varies pressure of liquid contained in the pressure chamber;

providing a light emitter and a light receiver;

emitting a light beam from the light emitter so as to intersect a space between the light emitter and the light receiver;

receiving the light beam which has been passed through the space by the light receiver;

generating a plurality of drive signals, each of which drives the actuator to eject a liquid droplet from the nozzle orifice under a condition different from the conditions established by the other drive signals;

calculating a time period a time period during which the liquid droplet intersects the light beam, with regard to every drive signal; and calculating a natural period of the liquid droplet based on a change in the time period which is obtained from the plural drive signals.

Preferably, each condition is determined such that the change in the time period has at least two peak values.

In this case, it is preferable that the natural period is determined as a time period represented by an interval of the peak values

BRIEF DESCRIPTION OF THE DRAWINGS

In the accompanying drawings:

FIG. 12 is a diagram showing specific waveform examples of a latch signal, a drive signal and an output pulse in the natural period measuring apparatus of FIG. 11;

FIG. 13 is a diagram showing another specific waveform examples of the latch signal, the drive signal and the output pulse in the natural period measuring apparatus of FIG. 11;

DETAILED DESCRIPTION OF THE PREFERRED EMBODIMENTS

Embodiments of the invention will be described hereinbelow by reference to the accompanying drawings.

Figure 1:
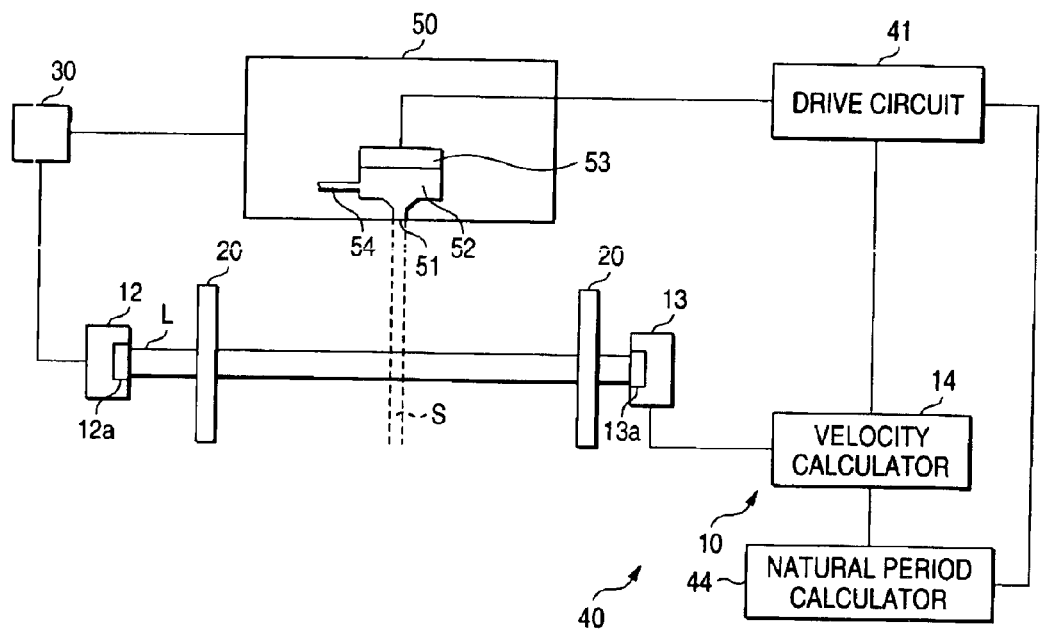
FIG. 1 is a schematic block diagram showing a natural period measuring apparatus according to a first embodiment of the invention.

As shown in FIG. 1, a natural period measuring apparatus 40 according to a first embodiment of the invention is provided for a head member 50.

The head member 50 comprises a nozzle orifice 51; a pressure generating chamber 52 which is in communication with the nozzle orifice 51 and can store liquid; a liquid supply channel 54 for supplying liquid to the pressure generating chamber 52; and a piezoelectric member 53 which causes the nozzle orifice 51 to eject a liquid droplet by deforming the pressure generating chamber 52. For example, a liquid droplet is an ink droplet including coloring material for drawing an image on recording paper.

The natural period measuring apparatus 40 comprises a drive circuit 41 for supplying a plurality of types of drive signals to the piezoelectric member 53, and a velocity measuring apparatus 10 for measuring the velocities of liquid droplets ejected from the nozzle orifice 51 in response to the respective drive signals.

The velocity measuring apparatus 10 of the embodiment comprises a light emitter 12 for emitting light along a trajectory L (hereinafter called a "light trajectory") crossing a passage space S through which a liquid droplet ejected from the nozzle orifice 51 passes (hereinafter simply referred to as a "passage space S"); a light receiver 13 for receiving the light that has crossed the passage space S; and a velocity calculator 14 for calculating the velocity of the liquid droplet ejected from the nozzle orifice 51, on the basis of a timing at which the piezoelectric member 53 is actuated by drive circuit 41 and the state of the light received by the light receiver 13.

Specifically, the light emitter 12 has a semiconductor laser 12a, and the light receiver 13 has a photodiode 13a. The light originating from the semiconductor laser 12a is received by the photodiode 13a after crossing the passage space S.

In the embodiment, the light trajectory L, the passage space S, and the light receiver 13 are arranged such that light-receiving operation performed by the light receiver 13 is interrupted during a period in which the liquid droplet is traveling across the passage space S.

The light receiver 13 outputs a pulse waveform P (see FIG. 3) having a width corresponding to a period during which the light-receiving operation has been interrupted, through photo-electric conversion processing performed by the photodiode 13a.

In the embodiment, one or more ink mist shielding plates 20 are interposed between the light emitter 12 and the passage space S and between the light receiver 13 and the passage space S. An opening for the light trajectory L is provided in each of the ink mist shielding plates 20.

Figure 2:
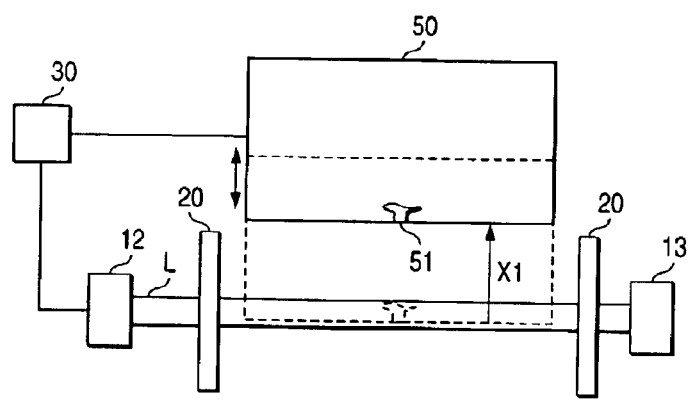
FIG. 2 is a diagram showing a position adjuster which adjusts a distance between a head member and a light trajectory in the natural period measuring apparatus of FIG. 1.

As shown in FIG. 2, in the embodiment, a high-precision position adjuster 30 is provided for adjusting a distance between the position of the nozzle orifice 51 of the head member 50 and the trajectory L of the light originating from the light emitter 12. In this case, the surface of the head member 50 having the nozzle orifice 51 formed therein is brought in parallel with the light trajectory L. The position adjuster 30 highly accurately actuates the side of the head member 50 having the nozzle orifice 51, in the direction perpendicular to the light trajectory L.

When the light trajectory L is interrupted by the head member 50 (indicated by broken lines shown in FIG. 2) as a result of relative actuation of the head member 50 by the position adjuster 30, the surface having the nozzle orifice 51 formed therein can be admitted to coincide with the light trajectory L. Subsequently, the surface having the nozzle orifice 51 formed therein and the light trajectory L can be positioned by the position adjuster so as to become spaced apart by predetermined interval "x."

Figure 3:
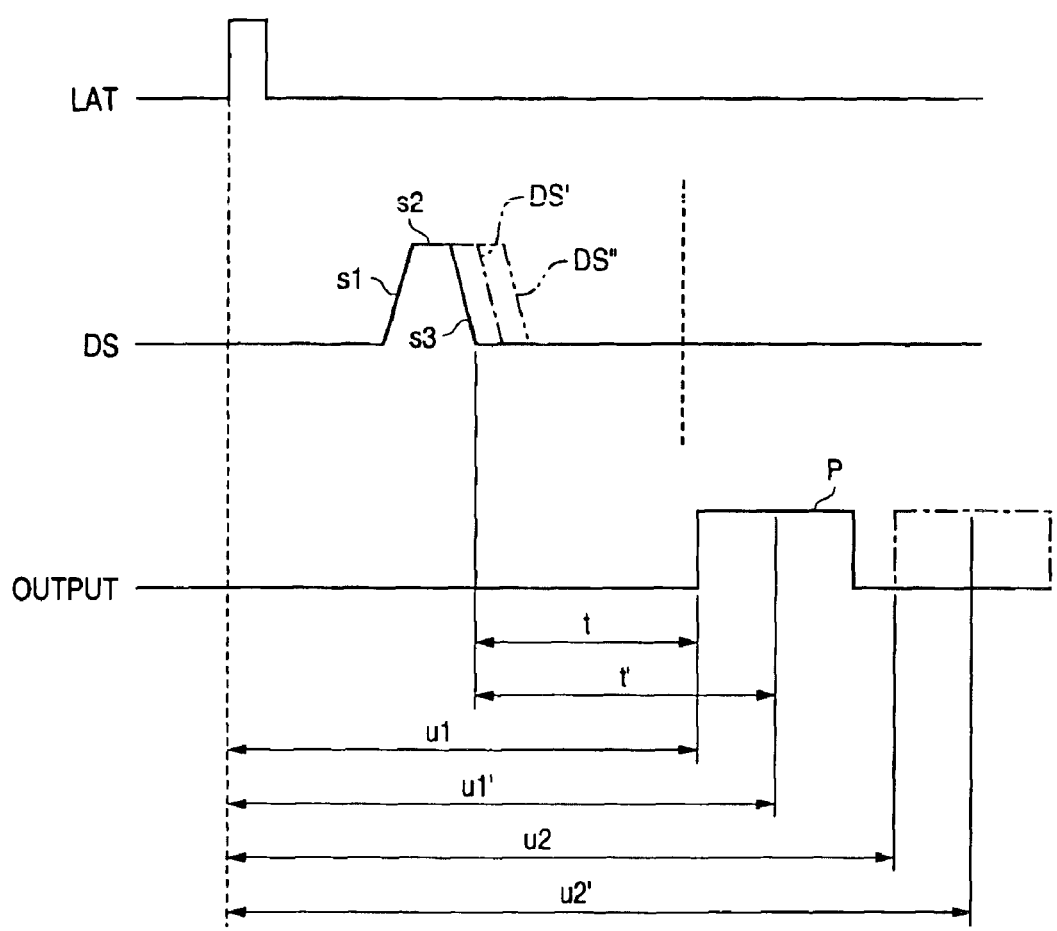
FIG. 3 is a diagram showing specific waveform examples of a latch signal, a drive signal and an output pulse in the natural period measuring apparatus of FIG. 1.

As shown in FIG. 3, the drive circuit 41 of the embodiment renders, in an enable state, a plurality of types of drive signal DS for activating the piezoelectric member 53. A latch signal LAT is taken as a trigger, as required, thereby sending the drive signals DS to the piezoelectric member 53.

In this case, each of the drive signals DS comprises a first voltage gradient section s1 for supplying, to the piezoelectric member 53, a voltage gradient for decompressing the inside of the pressure generating chamber 52 by expanding the pressure generating chamber 52; a first voltage holding section s2 for supplying a voltage, to the piezoelectric member 53, which maintains the decompressed state; and a second voltage gradient section s3 for supplying, to the piezoelectric member 53, a voltage gradient for compressing the inside of the pressure generating chamber 52 by contracting the pressure generating chamber 52 and restoring the pressure generating chamber 52 to an original state.

Figure 4:
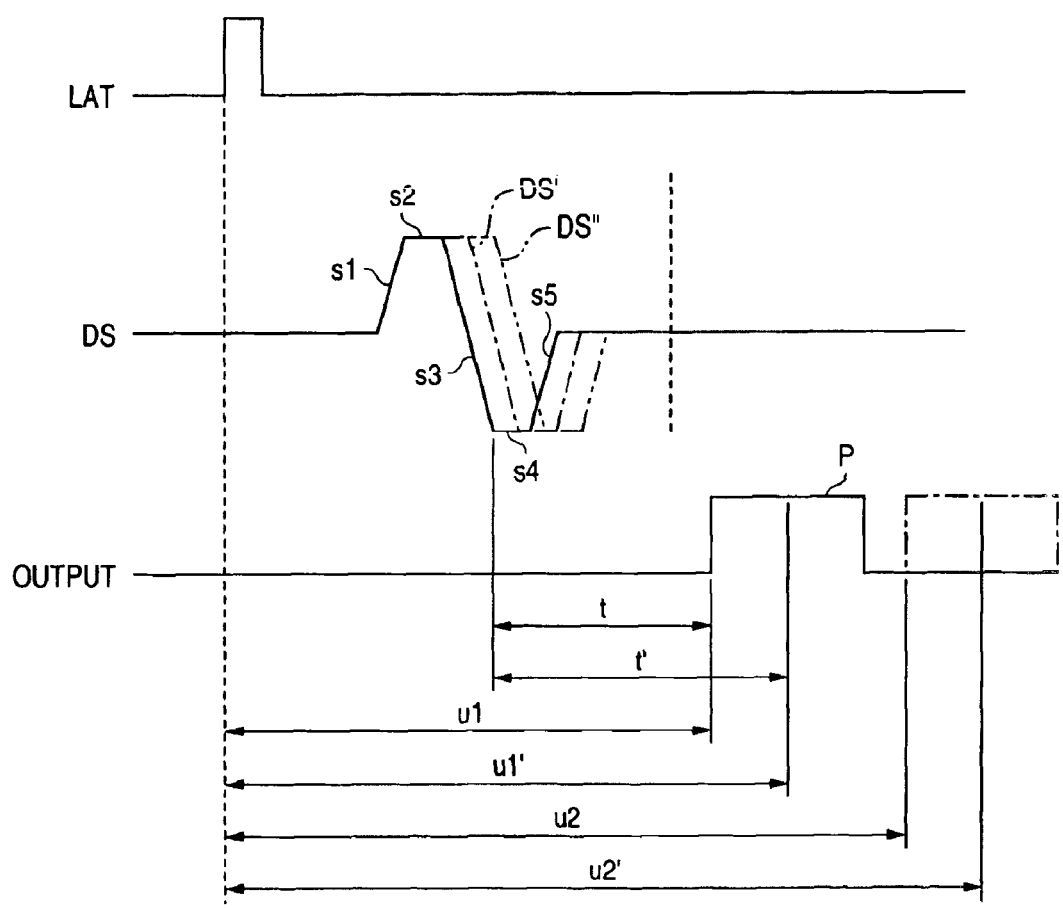
FIG. 4 is a diagram showing another specific waveform examples of the latch signal, the drive signal and the output pulse in the natural period measuring apparatus of FIG. 1.

Alternatively, as shown in FIG. 4, each of the drive signals DS comprises a first voltage gradient section s1 for supplying, to the piezoelectric member 53, a voltage gradient for decompressing the inside of the pressure generating chamber 52 by expanding the pressure generating chamber 52; a first voltage holding section s2 for supplying a voltage, to the piezoelectric member 53, which maintains the decompressed state; a second voltage gradient section s3 for supplying, to the piezoelectric member 53, a voltage gradient for compressing the inside of the pressure generating chamber 52 by contracting the pressure generating chamber 52; a second voltage holding section s4 for supplying, to the piezoelectric member 53, a voltage which maintains the compressed state; and a third voltage gradient section s5 for supplying, to the piezoelectric member 53, a voltage gradient which restores the pressure generating chamber 52 to an original state.

Even in either one of the cases shown in FIGS. 3 and 4, the plurality of drive signals DS differ from each other in terms of a duration of the first voltage holding section s2. Specifically, the duration of the first voltage holding section s2 in each of the plurality of drive signals DS is selected (set) so that two maximum values can be specified for the duration in connection with the velocity of a liquid droplet obtained by the velocity measuring apparatus 10, as will be described later.

When the piezoelectric member 53 is activated by each of the common drive signals DS, a liquid droplet is ejected from the nozzle orifice 51. More accurately, an ink droplet is ejected in the vicinity of a timing at which the second voltage gradient section s3 is finished (a timing at which switching is effected from the second voltage gradient section s3 to the second voltage holding section s4 in the case shown in FIG. 4).

The velocity calculator 14 derives the velocities of respective liquid droplets to be ejected from the nozzle orifice 51 from a timing at which the drive circuit 41 activates the piezoelectric member 53 and a timing of leading edge of the pulse waveform. On the basis of a time "t" from a timing at which the second voltage gradient s3 is finished (i.e., a timing at which switching from the second voltage gradient section s3 to the second voltage holding section s4 is effected in the case of FIG. 4) to a timing at which the pulse waveform P of the light receiver 13 rises and on the basis of a distance "x" between the nozzle orifice 51 to the light trajectory L, x/t is derived as the velocity of a liquid droplet.

The natural period measuring apparatus 40 comprises a natural period calculator 44 which derives a natural period of liquid stored in a pressure generating chamber 52 on a basis of a mutual relationship (see FIG. 5) between the plurality of types of drive signals DS and the velocities of liquid droplets obtained by the velocity measuring apparatus 10.

Specifically, the natural period calculator 44 specifies two peak values in the duration with regard to the velocities of liquid droplets obtained by the velocity measuring apparatus 10. A difference between the durations of the two first voltage holding sections corresponding to the two peak values is output as a natural period Tc of the liquid stored in the pressure generating chamber.

The operation of the velocity measuring apparatus will now be described.

As mentioned previously, to begin with, the state in which the light trajectory L is interrupted by the head member 50 (i.e., the state designated by broken lines shown in FIG. 2) as a result of the head member 50 being relatively actuated by the position adjuster 30 is admitted such that a distance between the surface having the nozzle orifice 51 formed therein and the light trajectory L is zero. Thus, zero adjustment is performed. Subsequently, the surface having the nozzle orifice 51 formed therein and the light trajectory L are positioned at a predetermined interval "x" with high accuracy.

Then, light which is to pass through the passage space S is emitted from the light emitter 12. The light is continuously received by the light receiver 13.

In this state, the drive circuit 41 sends a first drive signal DS to the piezoelectric member 53 while an appropriate latch signal LAT is taken as a trigger. As a result, the piezoelectric member 53 deforms the pressure generating chamber 52, thereby ejecting a liquid droplet from the nozzle orifice 51.

The thus ejected liquid droplet interrupts light while passing through the passage space S. Receipt of light by the light receiver 13 is interrupted, and the light receiver 13 outputs the pulse waveform P having a width corresponding to an interruption duration.

The velocity calculator 14 derives x/t as the velocity of a droplet on the basis of a time "t" from a timing at which the second voltage gradient s3 is finished (a timing at which switching is effected from the second voltage gradient section s3 to the second voltage holding section s4 in the case shown in FIG. 4) to a timing at which a pulse waveform P rises, and a distance "x" between the nozzle orifice 51 and the light trajectory L.

The drive circuit 41 sends a second drive signal DS' to the piezoelectric member 53 while an appropriate latch signal LAT is taken as a trigger. The second drive signal DS' is longer than the first drive signal DS in terms of the duration of the first voltage holding section s2. As a result, the piezoelectric member 53 deforms the pressure generating chamber 52, whereby a liquid droplet is ejected from the nozzle orifice 51.

The velocity of a liquid droplet ejected in accordance with the second drive signal DS' is measured in the same manner as in the case of measurement of velocity of a liquid droplet ejected in accordance with the first drive signal DS.

Subsequently, the drive circuit 41 sends a third drive signal DS'' to the piezoelectric member 53 while an appropriate latch signal LAT is taken as a trigger. The third drive signal DS'' is longer than the second drive signal DS' in terms of the duration of the first voltage holding section s2. As a result, the piezoelectric member 53 deforms the pressure generating chamber 52, whereby a liquid droplet is ejected from the nozzle orifice 51.

The velocity of a liquid droplet ejected in accordance with the third drive signal DS'' is measured in the same manner as in the case of measurement of velocities of the liquid droplets ejected in accordance with the first and drive signals DS and DS'.

In subsequent steps, supply of remaining drive signals DS to the piezoelectric member 53 and measurement of velocity of a liquid droplet ejected in accordance with the respective drive signals DS are performed sequentially. Since the respective drive signals DS have a duration of the order of microseconds, processing pertaining to the foregoing processes can be performed within an extremely short time period.

Figure 5:
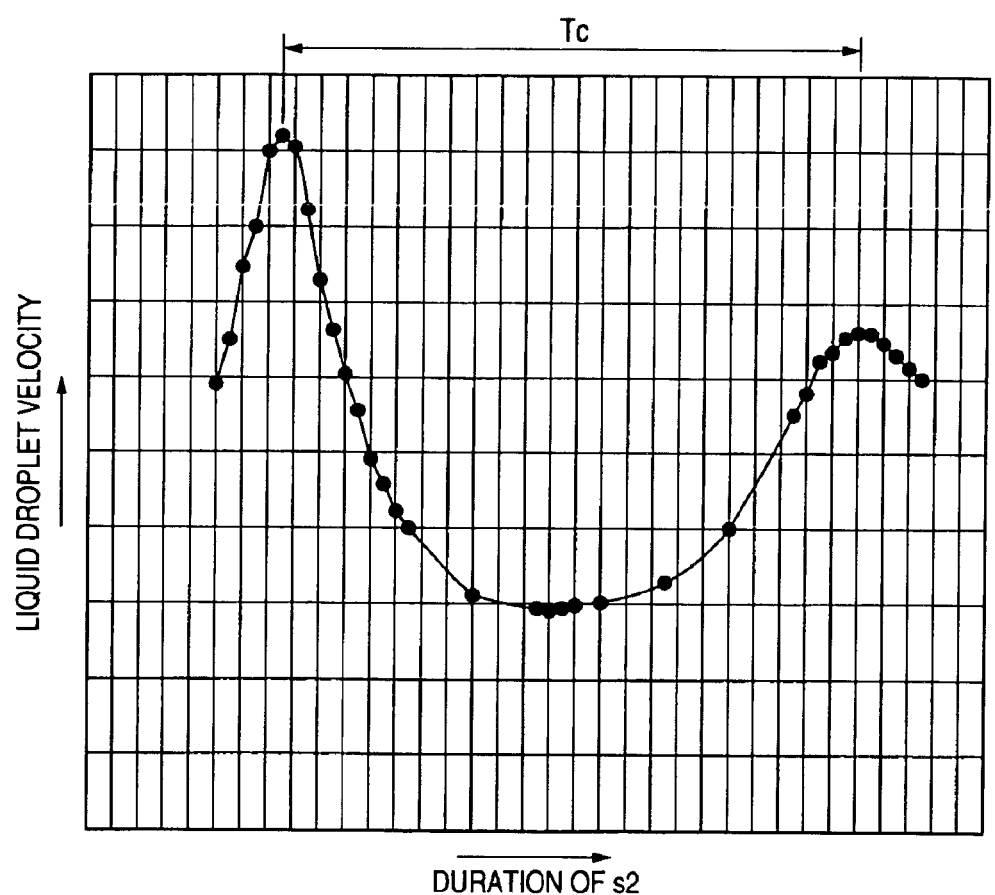
FIG. 5 is an example of a plot graph in which a duration of a first voltage holding section in the drive signal is taken as a horizontal axis and a liquid droplet velocity is taken as a vertical axis in the natural period measuring apparatus of FIG. 1;.

The natural period calculator 44 of the natural period measuring apparatus 40 prepares a plotted graph on the basis of the plurality of types of drive signals DS and the velocity of a liquid droplet obtained by the velocity measuring apparatus 10, wherein the duration of the first voltage holding section s2 is taken as a horizontal axis and the velocity of a liquid droplet is taken as a vertical axis. An example of such a plotted graph is shown in FIG. 5.

From such a plotted graph, the natural period calculator 44 of the natural period measuring apparatus 40 specifies two peak values in the duration with regard to the velocity of a liquid droplet. A difference between the durations of the two first voltage holding sections corresponding to the two peak values is output as a natural period Tc of the liquid stored in the pressure generating chamber 52.

In general, in a case where a liquid droplet is ejected from the nozzle orifice 51 by supplying the drive signal DS having a waveform pattern shown in FIG. 4 to the piezoelectric member 53, when a duration of the second voltage holding section s4 coincides with the natural period Tc of liquid stored in the pressure generating chamber 52, a highly superior damping effect can be achieved. Consequently, the natural period Tc of the liquid stored in the pressure generating chamber 52 is measured accurately, thereby enabling a noticeable improvement in capability of ejecting a liquid droplet from the nozzle orifice 51.

As mentioned above, according to the embodiment, the natural period calculator 44 derives a natural period of the liquid stored in the pressure generating chamber 52 on the basis of an inter-relationship between the plurality of types of drive signals DS and the velocity of the liquid droplet, the inter-relationship being determined by the velocity measuring apparatus 10. Hence, the natural period of the liquid stored in the pressure generating chamber 52 can be obtained with sufficient accuracy.

In the embodiment, the velocity of a liquid droplet is measured by determining passage of the liquid droplet across the light trajectory L. Hence, the velocity of a liquid droplet can be measured within an extremely short time period. Consequently, the natural period of the liquid stored in the pressure generating chamber 52 can be measured within an extremely short time period.

In the embodiment, receipt of light performed by the light receiver 13 is interrupted for a period during which a liquid droplet passes through the passage space S. A determination is readily made as to whether or not a droplet is passing across the light trajectory L.

Since the ink mist shielding plates 20 are interposed between the light emitter 13 and the passage space S and between the light receiver 14 and the passage space S, adhesion of ink mist to the light emitter 13 and the light receiver 14 can be avoided.

In the embodiment, the velocity calculator 14 calculates the velocity of a liquid droplet by use of a time "t" from a timing at which the second voltage gradient s3 is finished (a timing at which switching is effected from the second voltage gradient section s3 to the second voltage holding section s4 in the case of FIG. 4) to a timing at which a pulse waveform P of the light receiver 13 rises. However, when high-precision positioning of the center axis of the light trajectory L is possible, the velocity of a liquid droplet is preferably derived by use of a time "t" (see FIG. 3) from a timing at which the second voltage gradient s3 is finished (a timing at which switching is effected from the second voltage gradient section s3 to the second voltage holding section s4 in the case of FIG. 4) to the center of a pulse waveform P of the light receiver 13.

In the embodiment, the timing at which a liquid droplet is to be ejected is taken as a timing at which the second voltage gradient s3 is finished (a timing at which switching is effected from the second voltage gradient section s3 to the second voltage holding section s4 in the case of FIG. 4). However, an actual timing at which a liquid droplet is to be ejected may sometimes slightly deviate from a timing at which the second voltage gradient s3 is finished (a timing at which switching is effected from the second voltage gradient section s3 to the second voltage holding section s4 in the case of FIG. 4).

For this reason, by reference to FIG. 5 there will now be described a second embodiment of the invention which takes such a case into particular consideration.

The velocity measuring apparatus 10 of the embodiment further comprises a second light emitter 12' for emitting light on a second trajectory L' which crosses the space S across which a liquid droplet ejected from the nozzle orifice 51 passes; and a second light receiver 13' for receiving light of the second trajectory L' crossing the passage space S.

More specifically, the second light emitter 12' has a semiconductor laser 12a', and the second light emitter 13' has a photodiode 13a'. The light emitted from the semiconductor laser 12a' is received by the photodiode 13a' after crossing the passage space S.

The layout of a second trajectory L' of light (hereinafter called a "second light trajectory"), the passage space S, and the second light receiver 13' is adjusted such that receipt of light performed by the second light receiver 13' is interrupted while a liquid droplet is passing through the passage space S.

The second light receiver 13' outputs a pulse waveform P (see FIGS. 3 and 4) having a width corresponding to a period during which receipt of light is interrupted, by photoelectric conversion processing performed by the photodiode 13'.

In the embodiment, one or more ink mist shielding plates 20' are interposed between the second light emitter 12' and the passage space S and between the second light receiver 13' and the passage space S. An opening for the second light trajectory L' is provided in each of the ink mist shielding plates 20'.

On the basis of the state of the light received by the (first) light receiver 13 and the state of the light received by the second light receiver 13', the velocity calculator 14 derives the velocity of a liquid droplet ejected from the nozzle orifice 51.

More specifically, for example, the distance between the position of the nozzle orifice 51 and the (first) trajectory L of the light originating from the light emitter 12 is assumed to be x1 and the distance between the position of the nozzle orifice 51 and the (second) trajectory L' of the light originating from the light emitter 12' is assumed to be x2.

The velocity calculator 14 calculates a time u1 from a timing at which the latch signal LAT is supplied to a timing at which the pulse waveform P of the light receiver 13 rises, or another time u1' from a timing at which the latch signal LAT is supplied to a timing of center of the pulse waveform P of the light receiver 13 (see FIGS. 3 and 4).

The velocity calculator 14 calculates a time u2 from a timing at which the latch signal LAT is supplied to a timing at which the pulse waveform P of the light receiver 13' rises, or another time u2' from a timing at which the latch signal LAT is supplied to a timing of center of the pulse waveform P of the light receiver 13' (see FIGS. 3 and 4).

The velocity calculator 14 derives (x1–x2)/(u1–u2) or (x1–x2)/(u1'–u2') as the velocity of a liquid droplet.

In other respects, the velocity measuring apparatus of the embodiment is substantially identical in configuration with that of the first embodiment described with reference to FIGS. 1 though 4. In the embodiment, those elements which are the same as those described in connection with the first embodiment are assigned the same reference numerals, and their detailed explanations are omitted.

According to the embodiment, the velocity of a liquid droplet can be measured with considerably enhanced accuracy regardless of a timing at which an actual liquid droplet is ejected.

Alternatively, by use of an expression calibrated by any method or a corresponding table, the velocity calculator 14 may derive the ejection velocity of a liquid droplet on the basis of a time "u" from a timing at which a latch signal LAT is to be supplied to a timing at which the pulse waveform P of the light receiver 13 rises, or on the basis of a time "u'" from a timing at which the latch signal LAT is to be supplied to a timing of center of the pulse waveform P of the light receiver 13.

Figure 7:
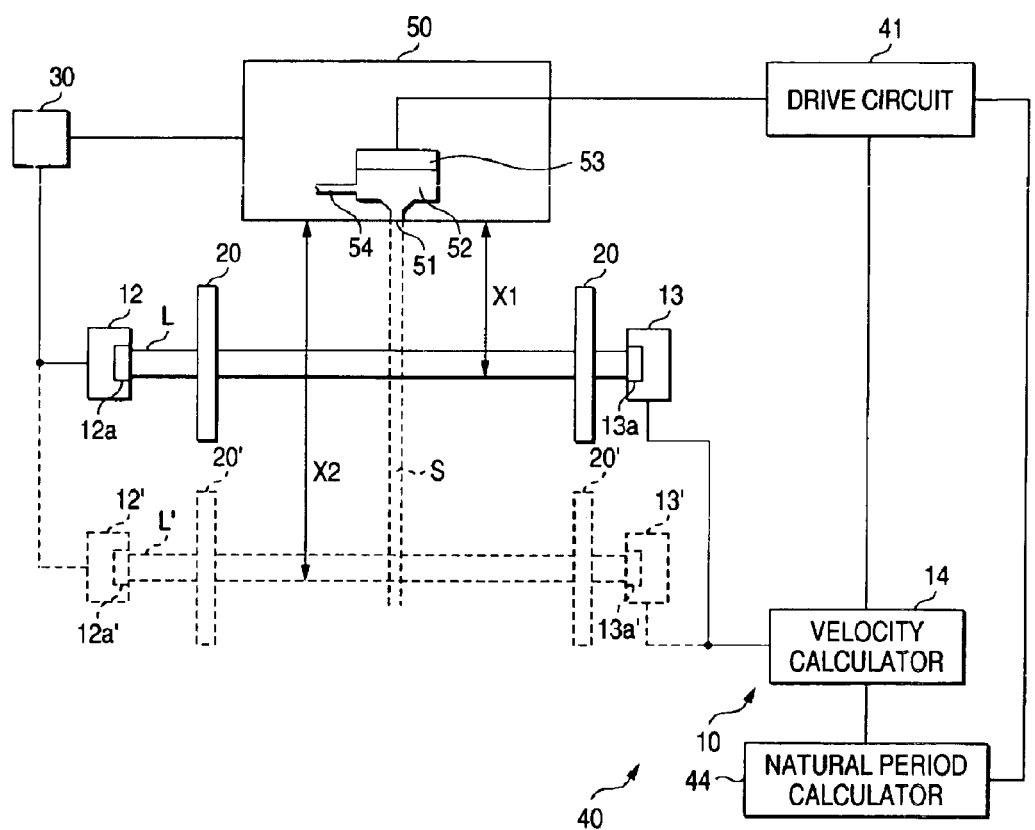
FIG. 7 is a schematic block diagram showing a natural period measuring apparatus according to a third embodiment of the invention.

A third embodiment of the invention will now be described by reference to FIG. 7, as a configuration which yields the same advantage.

A position adjuster 30 of the embodiment shown in FIG. 5 is arranged so as to enable at least two ways of setting of a distance between the position of the nozzle orifice 51 of the head member 50 and the trajectory L of light originating from the light emitter 12. On the basis of the state of light received by the light receiver 13 according to the two ways of setting, the velocity calculator 14 derives the velocity of a liquid droplet ejected from the nozzle orifice 51.

Figure 6:
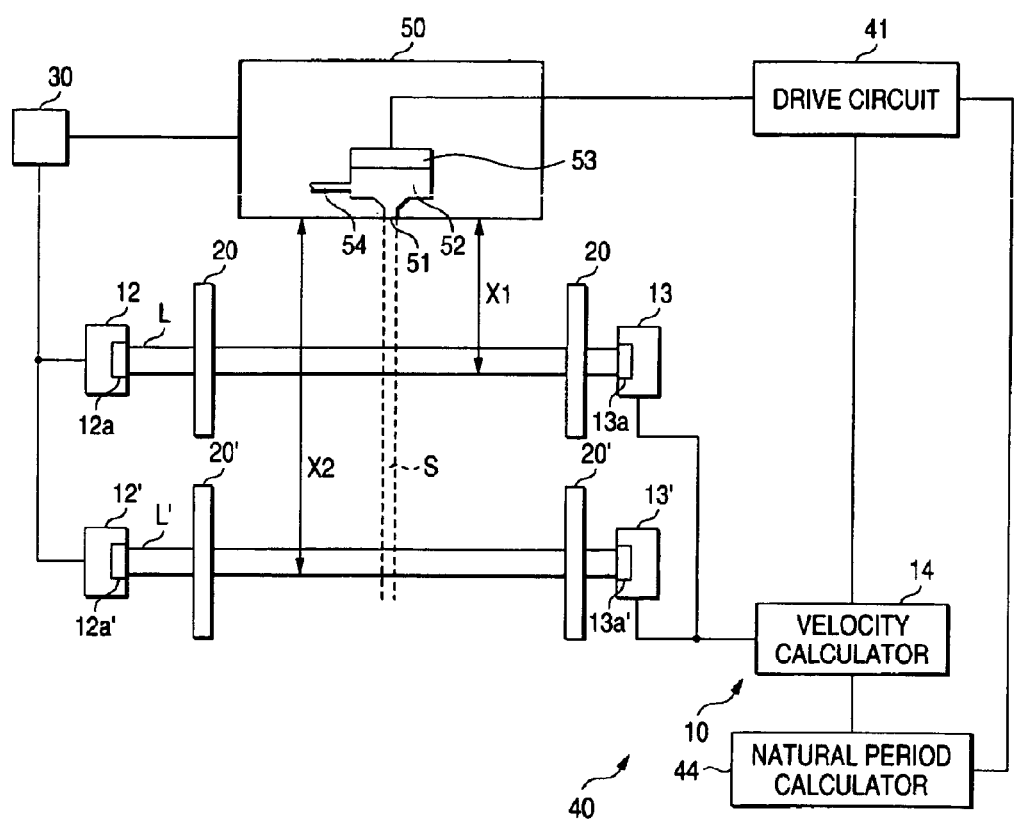
FIG. 6 is a schematic block diagram showing a natural period measuring apparatus according to a second embodiment of the invention.

In other respects, the velocity measuring apparatus of the embodiment is substantially identical with that of the second embodiment described by reference to FIG. 6. In the embodiment, those elements which are the same as those described in connection with the second embodiment are assigned the same reference numerals, and their detailed explanations are omitted.

Figure 8:
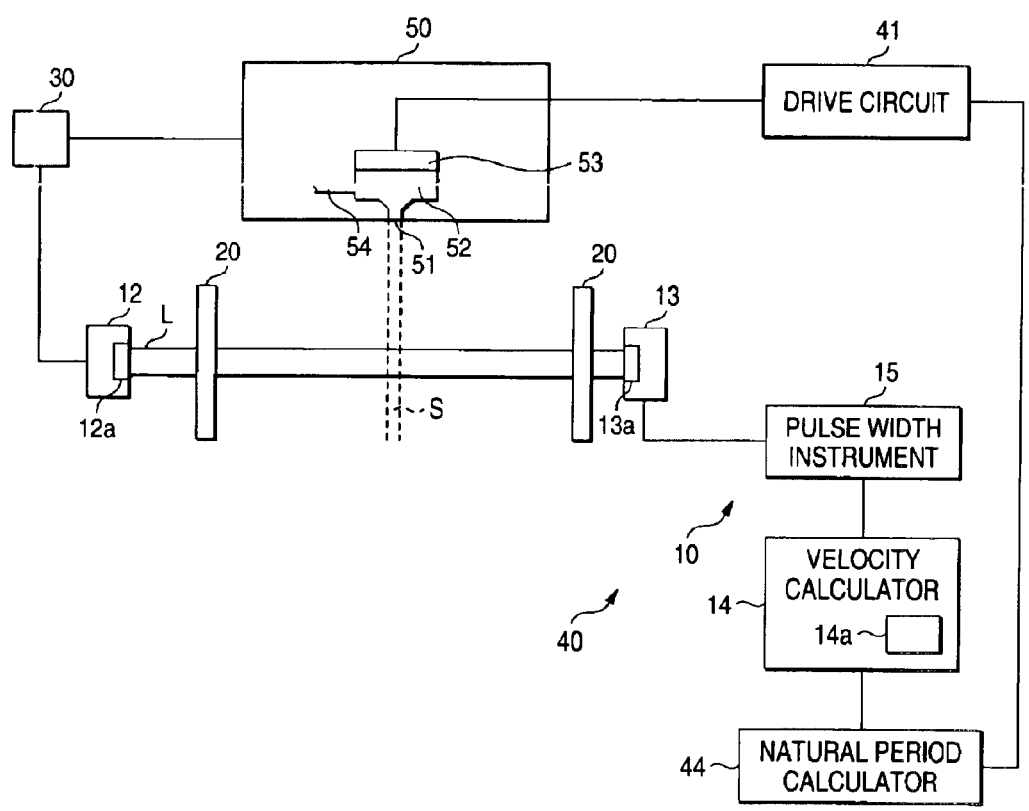
FIG. 8 is a schematic block diagram showing a natural period measuring apparatus according to a fourth embodiment of the invention.

In the embodiment, the ejection velocity of a droplet is derived on the basis of the ejection velocity of a liquid droplet on the basis of a time a "u" from a timing at which a latch signal LAT is to be supplied to a timing at which the pulse waveform P of the light receiver 13 rises, or a time "u'" from a timing at which the latch signal LAT is to be supplied to a timing of center of the pulse waveform P of the light receiver 13. However, the ejection velocity of a liquid droplet may be derived on the basis of the width "w" of the pulse waveform P. Such a configuration of the velocity measuring apparatus is shown in FIG. 8 as a fourth embodiment.

The velocity measuring apparatus 10 of the embodiment comprises a light emitter 12 for emitting light along a light trajectory L crossing a passage space S through which a liquid droplet pass; a light receiver 13 for receiving the light that has crossed the passage space S; a pulse width instrument 15 for measuring the width "w" of the pulse waveform P (see FIGS. 9 and 10) output from the light receiver 13; and a velocity calculator 14 for deriving the velocity of a liquid droplet to be ejected from the nozzle orifice 51 on the basis of the width "w" of the pulse waveform P.

The light receiver 13 outputs a pulse waveform P (see FIGS. 9 and 10) having a width corresponding to a period during which receipt of light is interrupted, by photoelectric conversion processing performed by the photodiode 13a. The pulse width instrument 15 connected to the light receiver 13 measures the width "w" of the pulse waveform P from a leading edge to a trailing edge thereof.

On the basis of the width "w" of the pulse waveform P measured by the pulse width instrument 15, the velocity calculator 14 derives the velocities of respective liquid droplets ejected from the nozzle orifice 51. Here, the width "w" of the pulse waveform corresponds to a period during which the light trajectory L is interrupted by the liquid droplet. In other words, the calculation is based on the fact that the width of a pulse waveform depends on the velocity of a liquid droplet. More specifically, the velocity of a liquid droplet corresponding to the width "w" of the pulse waveform is determined by use of an expression or corresponding table stored in the storage 14a provided in the velocity calculator 14. A distance "x" between the nozzle orifice 51 and the light trajectory L is used as a parameter, as required.

As mentioned above, according to the embodiment, the natural period calculator 44 derives a natural period of the liquid stored in the pressure generating chamber 52 on the basis of an inter-relationship between the plurality of types of drive signals DS and the velocity of the liquid droplet determined by the velocity measuring apparatus 10. Hence, the natural period of the liquid stored in the pressure generating chamber 52 can be obtained with sufficient accuracy.

In other respects, the velocity measuring apparatus of the embodiment is substantially identical in configuration with that of the first embodiment which has been described by reference to FIGS. 1 through 5. In the embodiment, those elements which are the same as those described in connection with the first embodiment are assigned the same reference numerals, and their detailed explanations are omitted.

The foregoing embodiment describes a case where a single pulse waveform P is produced as a result of the liquid droplet, which is ejected from the nozzle orifice 51 by the drive signal DS, passing across the light trajectory L.

However, there may be a case where the liquid droplet ejected from the nozzle orifice according to each of the drive signals DS may entail a so-called satellite droplet in addition to a main droplet. In such a case, the light receiver 13 produces a plurality of pulse waveforms in response to respective drive signals DS.

By reference to FIGS. 11 through 13, there will be described a fifth embodiment of the invention that can preferably cope with such a case.

Figure 11:
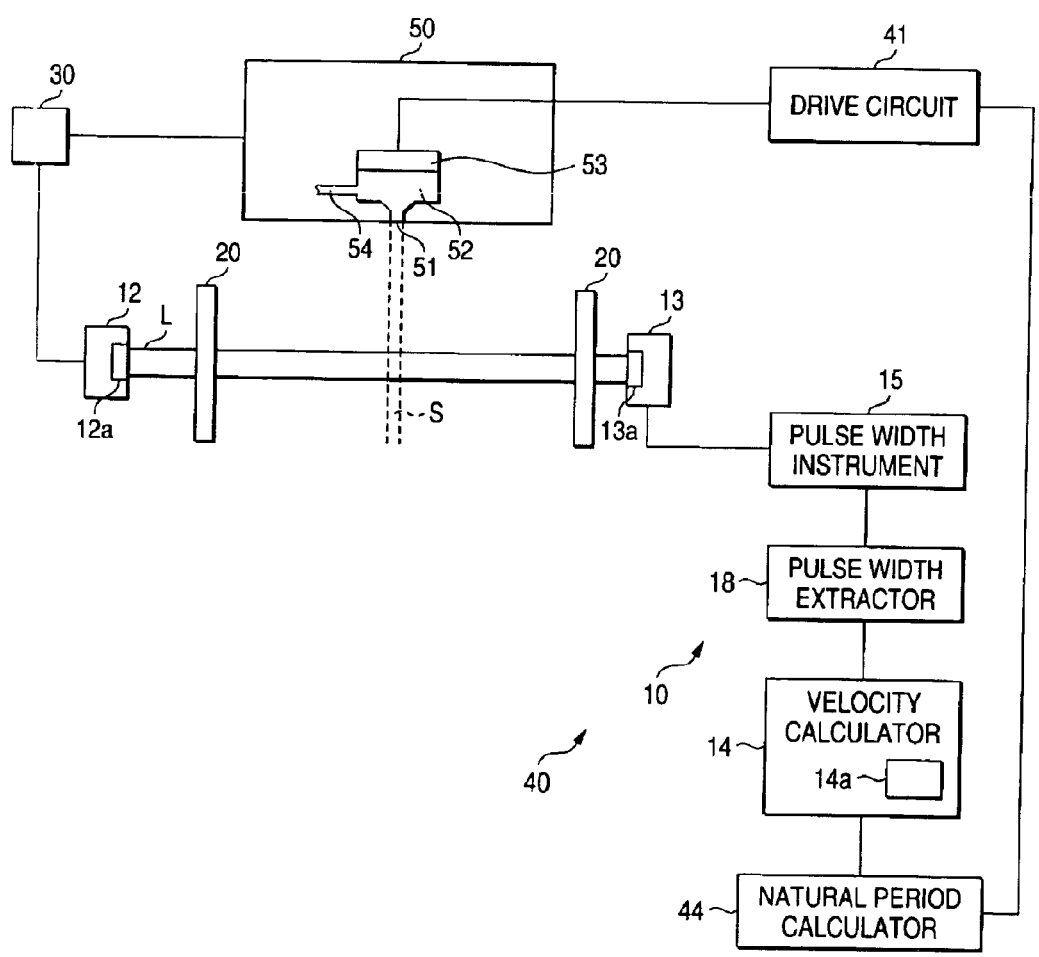
FIG. 11 is a schematic block diagram showing a natural period measuring apparatus according to a fifth embodiment of the invention.

As shown in FIG. 11, the natural period measuring apparatus 40 of the embodiment comprises a pulse width extractor 18 which is interposed between the pulse width instrument 15 and the velocity calculator 14 and extracts a width $w_{max}$ of the maximum pulse waveform for each drive signal. On the basis of the width $w_{max}$ of the maximum pulse waveform, the velocity calculator 14 of the embodiment derives the velocity of a liquid droplet to be ejected from the nozzle orifice 51.

Figure 9:
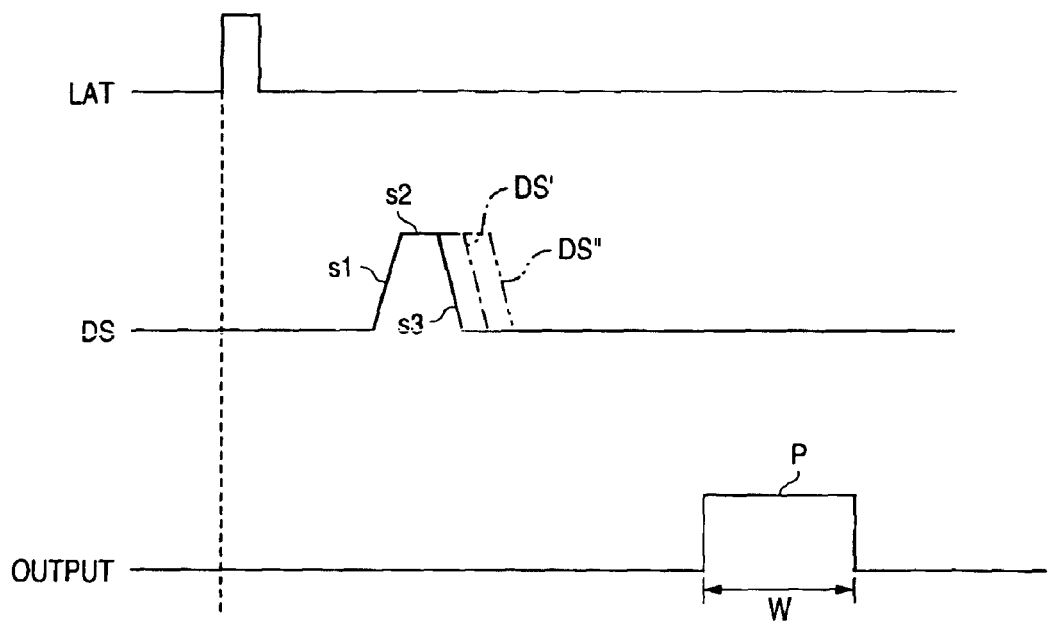
FIG. 9 is a diagram showing specific waveform examples of a latch signal, a drive signal and an output pulse in the natural period measuring apparatus of FIG. 8.
Figure 10:
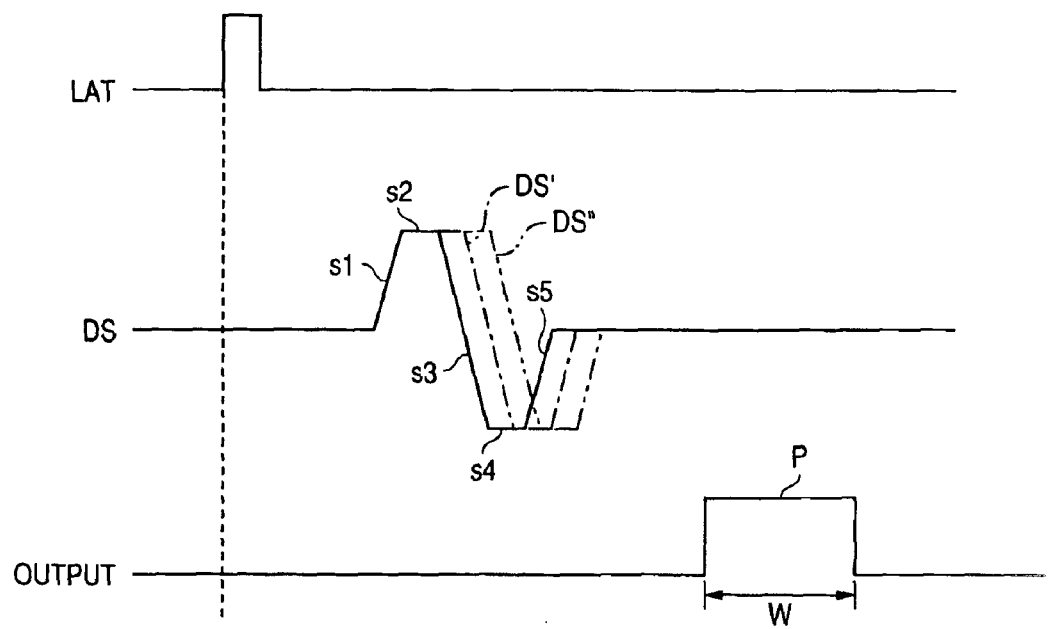
FIG. 10 is a diagram showing another specific waveform examples of the latch signal, the drive signal and the output pulse in the natural period measuring apparatus of FIG. 8.

As shown in FIGS. 12 and 13 corresponding to FIGS. 9 and 10, according to the embodiment, even when a plurality of pulse waveforms P are produced as a result of presence of a satellite droplet, the width of the pulse waveform P corresponding to the main droplet can be ascertained at all times as the width $w_{max}$ of the maximum pulse waveform. Accordingly, the natural period Tc of the liquid stored in the pressure generating chamber 52 can be measured with high accuracy at all times without regard to presence of a satellite droplet.

In the embodiments, the velocity of a liquid droplet ejected from the nozzle orifice 51 is calculated, and then the natural period Tc of the liquid stored in the pressure generating chamber 52 is determined. However, a natural period can be determined directly from the width of the pulse waveform P without involvement of calculation of the velocity of a liquid droplet.

Figure 14:
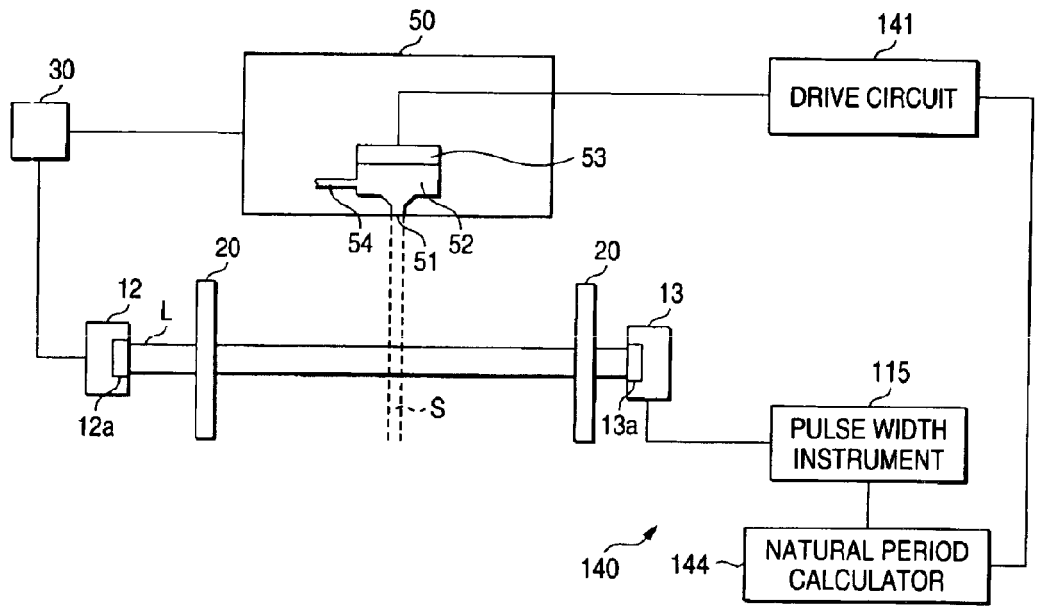
FIG. 14 is a schematic block diagram showing a natural period measuring apparatus according to a sixth embodiment of the invention.

The natural period measuring apparatus of the sixth embodiment that has been constructed above will be described by reference to FIGS. 14 and 15. As shown in FIG. 14, the natural period measuring apparatus 140 of the embodiment comprises a drive circuit 141 for supplying a plurality of types of drive signals to the piezoelectric member 53; a light emitter 112 for emitting light along a light trajectory L so as to cross a passage space S through which a liquid droplet ejected from the nozzle orifice 51 passes; a light receiver 113 for receiving the light that has crossed the passage space S; a pulse width instrument 115 which measures the width "w" of the pulse waveform P (see FIGS. 9 and 10) output from the light receiver 113; and a velocity calculator 144 for deriving the natural period Tc of the liquid stored in the pressure generating chamber 52 on the basis of an inter-relationship (see FIG. 15) between the plurality of types of drive signals DS and the width "w" of the pulse waveform P, the inter-relationship being determined by the pulse width instrument 115.

As in the case of the drive circuit 41 of the fourth embodiment shown in FIG. 9 or 10, the drive circuit 141 of the embodiment renders, in an enable state, the plurality of types of drive signals DS for activating the piezoelectric member 53. The drive signals DS are sent to the piezoelectric member 53 while an appropriate latch signal LAT is taken as a trigger.

Even when any one of the drive signals shown in FIGS. 9 and 10 is used, a plurality of drive signals DS differ from each other in a duration of the first voltage holding section s2. Specifically, as will be described later, the duration of the first voltage holding section s2 of the plurality of drive signals DS is selected (set) so that two peak values can be specified for the duration with regard to the width "w" of the pulse waveform obtained by the pulse width instrument 115.

When the piezoelectric member 53 is activated by the respective drive signals DS, a liquid droplet is ejected from the nozzle orifice 51. More accurately, a liquid droplet is ejected in the vicinity of a timing at which the second voltage gradient section s3 is finished (a timing at which switching is effected from the second voltage gradient section s3 to the second voltage holding section s4 in the case shown in FIG. 10).

Figure 15:
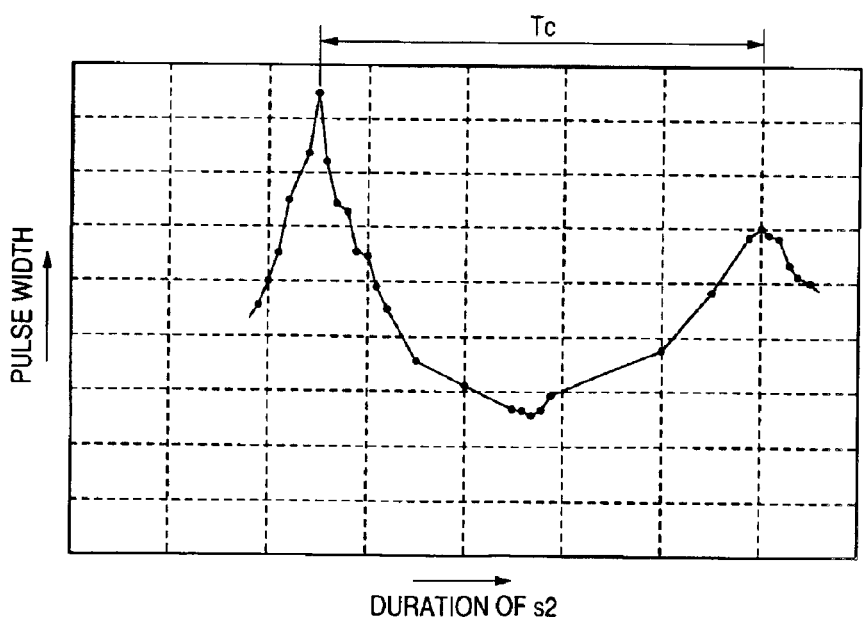
FIG. 15 is an example of a plot graph in which a duration of a first voltage holding section in the drive signal is taken as a horizontal axis and a pulse width is taken as a vertical axis in the natural period measuring apparatus of FIG. 14.

The velocity calculator 144 of the natural period measuring apparatus 140 prepares a plotted graph on the basis of the plurality of types of drive signals DS and the width awn of the pulse waveform P obtained by the pulse width instrument 115, wherein the duration of the first voltage holding section s2 is taken as a horizontal axis and the width W of the pulse waveform P is taken as a vertical axis., An example of such a plotted graph is shown in FIG. 15.

From such a plotted graph, the natural period velocity calculator 144 of the natural period measuring apparatus 140 specifies two peak values in the duration with regard to the width "w" of the pulse waveform P. A difference between the durations of the two first voltage holding sections corresponding to the two peak values is output as a natural period Tc of the liquid stored in the pressure generating chamber 52.

As mentioned above, according to the embodiment, the natural period Tc of the liquid stored in the pressure generating chamber 52 can be determined directly without involvement of determination of velocity of a liquid droplet ejected from the nozzle orifice. In this case, the natural period Tc of the liquid stored in the pressure generating chamber 52 can be obtained with sufficient accuracy and in a shorter time period.

In other respects, the velocity measuring apparatus of the embodiment is substantially identical in configuration with that of the first embodiment which has been described by reference to FIGS. 1 through 5. In the embodiment, those elements which are the same as those described in connection with the first embodiment are assigned the same reference numerals, and their detailed explanations are omitted.

The sixth embodiment describes a case where a single pulse waveform P is produced as a result of the liquid droplet, which is ejected from the nozzle orifice 51 by the drive signal DS, passing across the light trajectory L.

However, there may be a case where the liquid droplet ejected from the nozzle orifice according to each of the drive signals DS may entail a so-called satellite droplet in addition to a main droplet. In such a case, the light receiver 113 produces a plurality of pulse waveforms in response to respective drive signals DS.

By reference to FIGS. 13 and 16, there will be described a seventh embodiment of the invention that can preferably cope with such a case.

Figure 16:
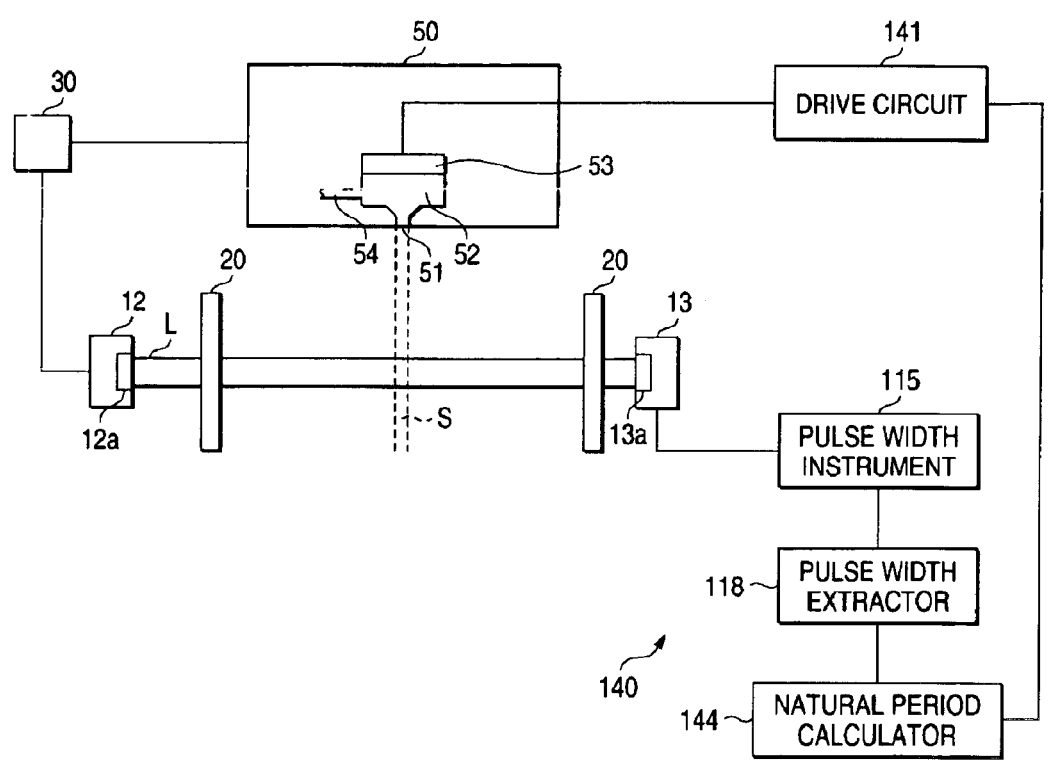
FIG. 16 is a schematic block diagram showing a natural period measuring apparatus according to a seventh embodiment of the invention.

As shown in FIG. 16, the natural period measuring apparatus 140 of the embodiment comprises a pulse width extractor 118 which is interposed between the pulse width instrument 115 and the velocity calculator 144 and extracts a width $w_{max}$ of the maximum pulse waveform for each drive signal. On the basis of the plurality of types of drive signals DS and the width $w_{max}$ of the maximum pulse waveform obtained by the pulse width extractor 118, the velocity calculator 144 of the embodiment derives the natural period Tc of the liquid stored in the pressure generating chamber 52.

As shown in FIGS. 12 and 13, according to the embodiment, even when a plurality of pulse waveforms P are produced as a result of presence of a satellite droplet, the width of the pulse waveform P corresponding to the main droplet can be ascertained at all times as the width $w_{max}$ of the maximum pulse waveform. Accordingly, the natural period Tc of the liquid stored in the pressure generating chamber 52 can be measured with high accuracy at all times without regard to presence of a satellite droplet.

Figure 17:
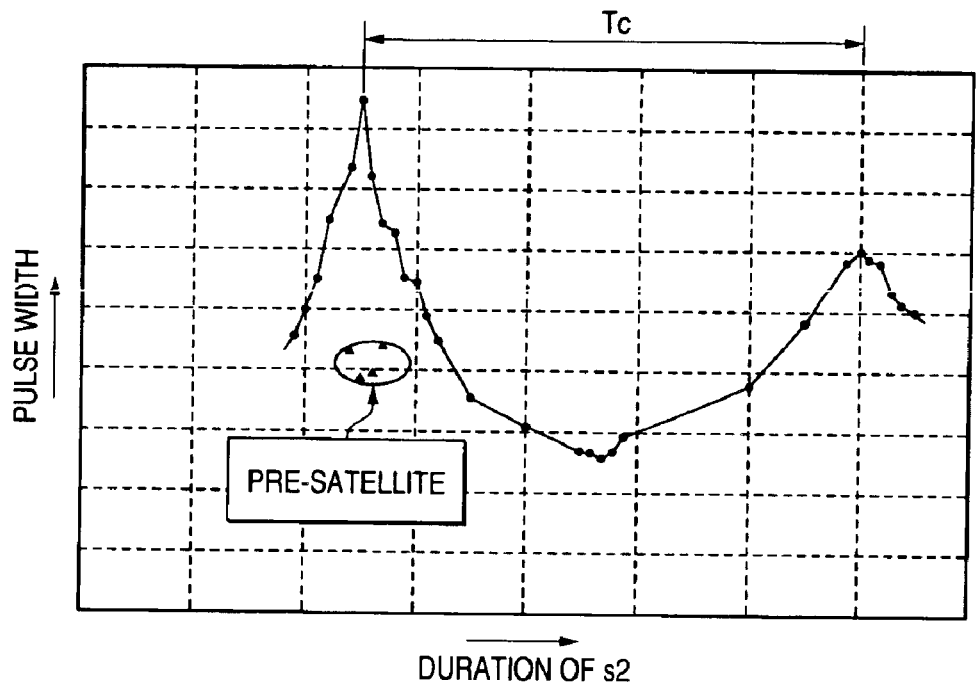
FIG. 17 is an example of a plot graph in which a duration of a first voltage holding section in the drive signal is taken as a horizontal axis and a pulse width is taken as a vertical axis in the natural period measuring apparatus of FIG. 16.

As shown in FIG. 17, for example, even when the pulse width instrument 115 has measured the width of a pulse waveform corresponding to a pre-satellite droplet (the width is smaller than the width of a pulse waveform corresponding to the main droplet), the pulse width extractor 118 does not extract such data (or neglects such data), thereby enabling highly-accurate designation of two peak values in the duration with regard to the width "w" of the pulse waveform P. As a result, the natural period To of the liquid stored in the pressure generating chamber 52 can be measured with high accuracy.

In other respects, the velocity measuring apparatus of the embodiment is substantially identical in configuration with that of the sixth embodiment which has been described by reference to FIGS. 14 and 15. In the embodiment, those elements which are the same as those described in connection with the sixth embodiment are assigned the same reference numerals, and their detailed explanations are omitted.

Figure 18:
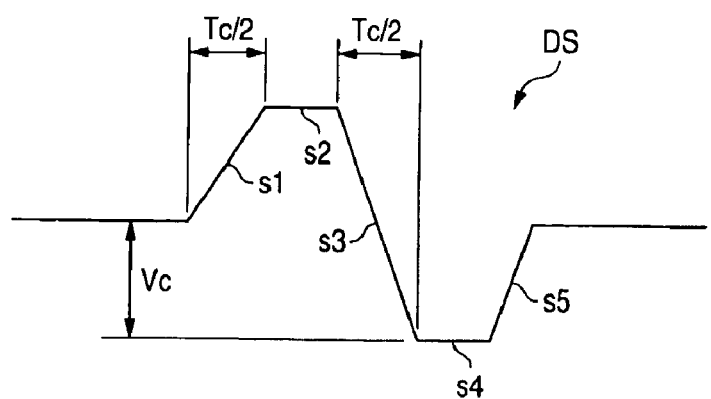
FIG. 18 is a schematic block diagram showing a natural period measuring apparatus according to an eighth embodiment of the invention.

The inventors have found a more preferable drive signal waveform useful for measuring the natural period Tc of the liquid stored in the pressure generating chamber 52 through use of a type of the drive signal DS shown in FIG. 4. A natural period measuring apparatus of an eighth embodiment using the waveform will now be described by reference to FIG. 18.

In the drive signal waveform of the embodiment, the duration (i.e., charging time period) of the first voltage gradient section s1 is one-half the natural period Tc of the liquid stored in the pressure generating chamber 52. Further, the duration s3 (discharging time period) of the second voltage gradient section is one-half the natural period Tc of the liquid stored in the pressure generating chamber 52. The inventors have found that the natural period Tc can be measured with high accuracy under such requirements for a waveform.

Here, the natural period To per se is an object of measurement. Hence, the value of one-half the natural period Tc is uncertain before measurement is actually performed. For this reason, one-half or less a previously-known value pertaining to the natural period of the liquid stored in the pressure generating chamber 52; for instance, one-half or less a designed value or a value determined by use of another drive signal waveform, is utilized as one half or less the natural period Tc, whereby a preferable drive signal waveform shown in FIG. 18 can be produced.

More preferably, a potential difference Vc between the voltage of the first voltage gradient section s1 before supply of a voltage gradient (before charging) and the voltage maintained by the second voltage holding section s3 (after electrical discharging) is equal to a desired drive voltage difference arising when the head member ejects liquid droplets. Since the potential difference Vc directly affects the extent to which a meniscus forming on liquid in a nozzle orifice is to be retracted, the potential difference Vc is adjusted so as to become equal to the desired drive voltage difference, thereby enabling measurement of the natural period Tc while requirements for inertia contributing to control of ejection of a liquid droplet are satisfied Consequently, the natural period Tc required at the time of control of ejection of a liquid droplet can be measured with high efficiency.

In other respects, the velocity measuring apparatus of the embodiment is substantially identical in configuration with that of the first embodiment which has been described by reference to FIGS. 1 through 5. In the embodiment, those elements which are the same as those described in connection with the first embodiment are assigned the same reference numerals, and their detailed explanations are omitted.

Figure 19:
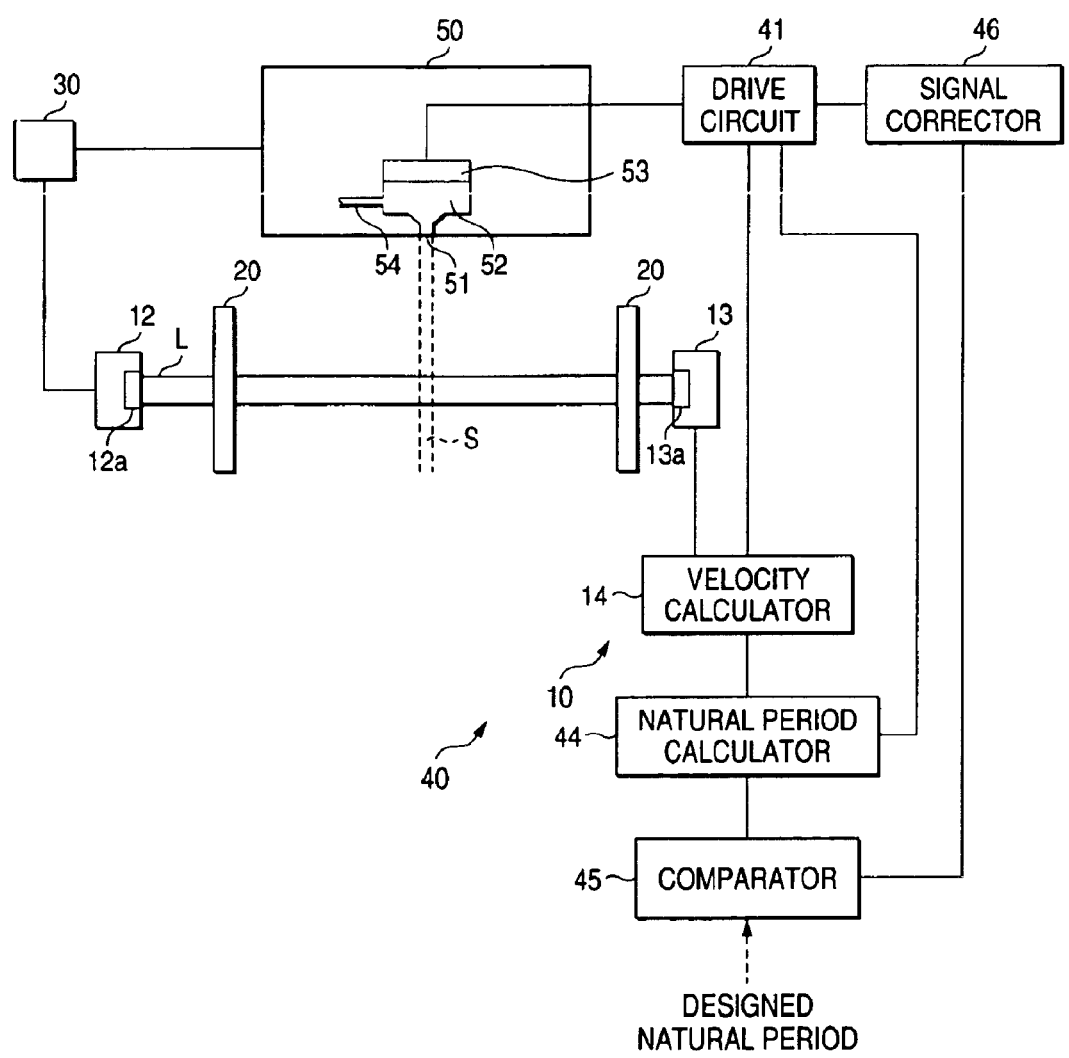
FIG. 19 is a schematic block diagram showing a natural period measuring apparatus according to a ninth embodiment of the invention.

A natural period measuring apparatus according to a ninth embodiment of the invention will now be described by reference to FIGS. 19 and 20 as another configuration of the device for determining the natural period of the liquid stored in the pressure generating chamber with sufficiently highly accuracy while excluding influence of a pre-satellite droplet.

In the embodiment, the natural period calculator 44 is connected to a comparator 45 which utilizes a predicted design natural period. The comparator 45 determines a difference between a natural period derived by the natural period calculator 44 and the predicted design natural period, thereby determining whether or not the difference falls within a predetermined range.

The comparator 45 is connected to a signal corrector 46 which controls the drive circuit 41 when the comparator 45 has determined that the difference exceeds the predetermined range, thereby modifying the plurality of drive signals DS supplied from the drive circuit 41 to the piezoelectric member 53. In this case, when either the drive signal shown in FIG. 3 or the drive signal shown in FIG. 4 is applied, the voltage value (drive voltage value) of the first voltage gradient section s2 is reduced to, e.g., 80% the original voltage value.

If a result of comparison between the natural period Tc obtained by the natural period calculator 44 and the predicted design natural period performed by the comparator 45 shows that these two natural periods are close to each other, measurement of the natural period Tc is determined to have been performed correctly. However, if they differ much from each other; that is, if a difference between the natural period Tc and the predicted design natural period exceeds a predetermined range, measurement of the natural period Tc is performed again.

Figure 20:
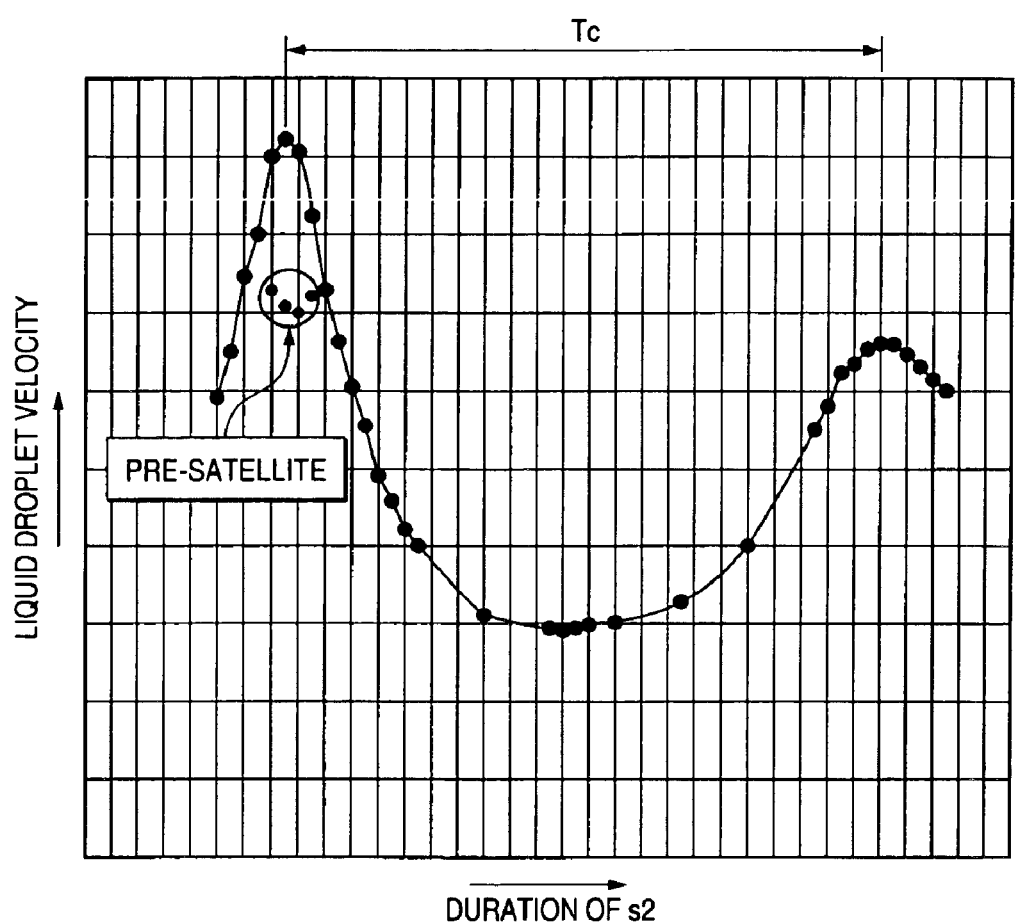
FIG. 20 is an example of a plot graph in which a duration of a first voltage holding section in the drive signal is taken as a horizontal axis and a liquid droplet velocity is taken as a vertical axis in the natural period measuring apparatus of FIG. 19, showing a case where pre-satellite droplets are generated.

The difference may exceed the predetermined range when a liquid droplet ejected from the nozzle orifice is associated with a pre-satellite droplet in addition to a main droplet The reason for this is that, when the velocity of the pre-satellite droplet is measured by the velocity measuring apparatus 10, the graph shown in FIG. 5 assumes a plot shown in FIG. 20, thereby posing difficulty in execution of processing pertaining to a process of specifying two peak values with regard to the duration.

When measurement of the natural period Tc is performed again, the signal corrector 46 controls the drive circuit 41, thereby modifying the plurality of drive signals DS supplied from the drive circuit 41 to the piezoelectric member 53. In this case, when either the drive signal shown in FIG. 3 or the drive signal shown in FIG. 4 is applied, the voltage value (drive voltage value) of the first voltage gradient section s2 is reduced to, e.g., 80% the original voltage value.

Occurrence of a pre-satellite droplet can be inhibited by reducing the drive voltage value in the aforesaid manner.

In the same manner as mentioned previously, supply of a corrected drive signal DS to the piezoelectric member 53 and measurement of the velocity of a liquid droplet ejected in accordance with each of the drive signals DS are performed sequentially. Since the durations of respective drive signals DS are of the magnitude of microseconds, processing pertaining to the foregoing processes can be performed within a considerably short time period.

The natural period calculator 44 of the natural period measuring apparatus 40 again prepares a plotted graph on the basis of the plurality of types of corrected drive signals DS and the velocity of a liquid droplet obtained by the velocity measuring apparatus 10, wherein the duration of the first voltage holding section s2 is taken as a horizontal axis and the velocity of a liquid droplet is taken as a vertical axis.

From such a plotted graph, the natural period calculator 44 of the natural period measuring apparatus 40 specifies two peak values in the duration of the first voltage holding section s2 with regard to the velocity of a liquid droplet. A difference between the durations of the two first voltage holding sections corresponding to the two peak values is output as a natural period Tc of the liquid stored in the pressure generating chamber 52.

The comparator 45 again compares the natural period Tc obtained by the natural period calculator 44 with the predicted design natural period.

Processing pertaining to the foregoing processes is repeated until the two natural periods become close to each other; that is, until the difference between the natural period Tc and the predicted design natural period is determined to fall within a predetermined range. A natural period of the liquid stored in the pressure generating chamber 52 can be determined with sufficiently highly accuracy while excluding influence of a pre-satellite droplet.

As mentioned above, according to the embodiment, the natural period calculator 44 derives the natural period of the liquid stored in the pressure generating chamber 52 on the basis of the plurality of types of drive signals DS and the velocity of the liquid droplet obtained by the velocity measuring apparatus 10. Hence, the natural period of the liquid stored in the pressure generating chamber 62 can be determined with sufficiently high accuracy.

In particular, according to the embodiment, a liquid droplet to be ejected is associated with a pre-satellite droplet in addition to a main droplet. Hence, even when measurement of the natural period Tc cannot be performed accurately under the influence of the pre-satellite droplet (the difference between the derived natural period Tc and the predicated design natural period exceeds a predetermined range at this time), a plurality of drive signals DS supplied to the piezoelectric member 53 are corrected, whereby the velocity of respective liquid droplets is measured again. Then, the natural period Tc of the liquid stored in the pre-satellite droplet 52 is derived again. Hence, the natural period of the liquid stored in the pressure generating chamber can be determined with sufficiently high accuracy.

In other respects, the velocity measuring apparatus of the embodiment is substantially identical in configuration with that of the first embodiment which has been described by reference to FIGS. 1 through 5. In the embodiment, those elements which are the same as those described in connection with the first embodiment are assigned the same reference numerals, and their detailed explanations are omitted.

In the foregoing embodiment, the velocity of a liquid droplet ejected from the nozzle orifice 51 is calculated, thereby determining the natural period Tc of the liquid stored in the pressure generating chamber 52. However, the velocity of a liquid droplet (i.e., the dimension of a velocity) is not calculated, and hence a natural period can be determined directly on the basis of a time "t" from a timing at which the second voltage gradient s3 is finished (i.e., a timing at which switching from the second voltage gradient section s3 to the second voltage holding section s4 is effected in the case shown in FIG. 4) to a timing at which the pulse waveform P rises.

Figure 21:
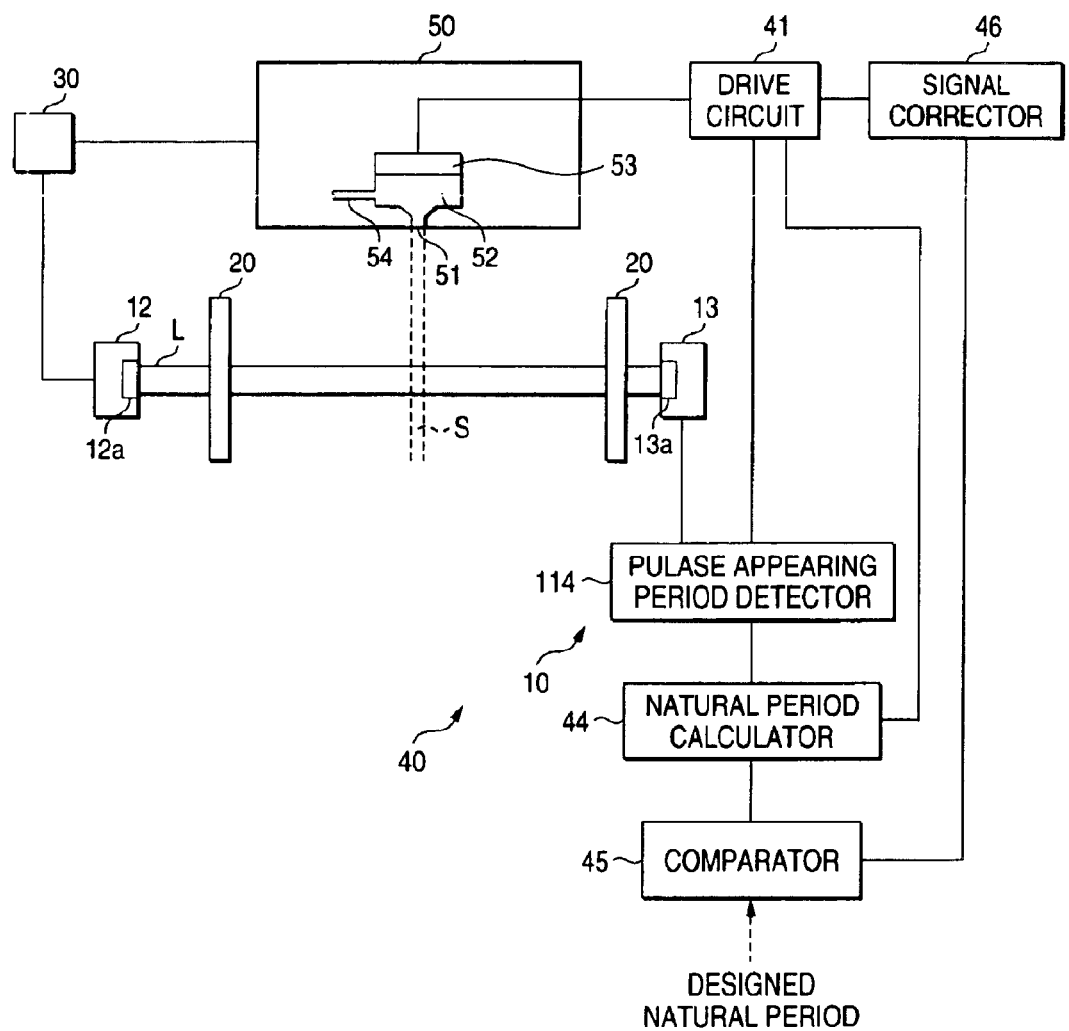
FIG. 21 is a schematic block diagram showing a natural period measuring apparatus according to a tenth embodiment of the invention.
Figure 22:
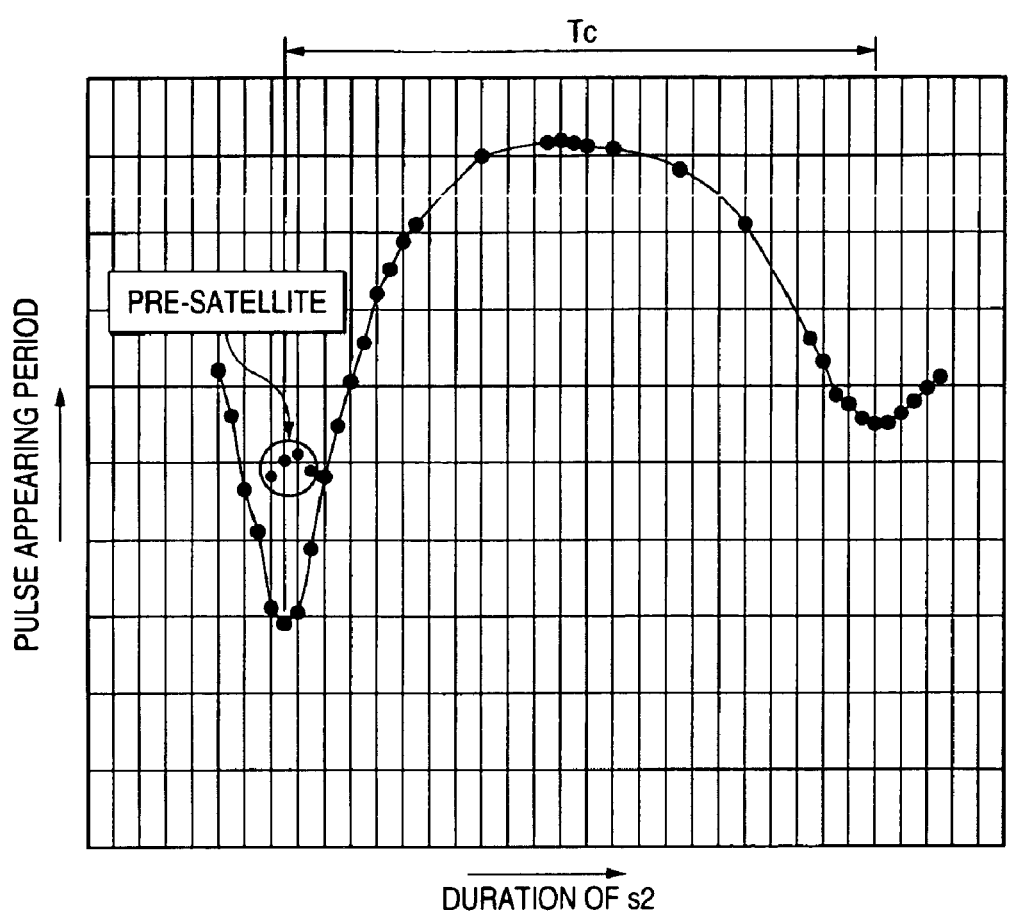
FIG. 22 is an example of a plot graph in which a duration of a first voltage holding section in the drive signal is taken as a horizontal axis and a pulse appearing time period is taken as a vertical axis in the natural period measuring apparatus of FIG. 21.

A natural period measuring apparatus according to a tenth embodiment of the invention having the foregoing construction will now be described by reference to FIGS. 21 and 22. As shown in FIG. 21, the natural period measuring apparatus 40 of the embodiment is provided with a pulse appearing time period (latch pulse time period) detector 114 in place of the velocity calculator 14.

On the basis of the time "t" and a distance "x" between the nozzle orifice 51 and the light trajectory L, the velocity calculator 14 derives x/t as the velocity of a liquid droplet. In contrast, the pulse appearing time period detector 140 merely acquires the time "t."

In other respects, the velocity measuring apparatus of the embodiment is substantially identical in configuration with that of the ninth embodiment which has been described by reference to FIGS. 19 and 20. In the embodiment, those elements which are the same as those described in connection with the first embodiment are assigned the same reference numerals, and their explanations are omitted.

As is evident from the relationship, an inverse proportional relationship exists between the time "t" and the velocity of a liquid droplet. Hence, in the case of the embodiment, an advantage identical with that yielded in the ninth embodiment can be achieved. For instance, a plotted graph which can be prepared for determining a natural period Tc assumes a graph shown in FIG. 22. Two bottom values are specified with regard to the time "t" and the duration of the first voltage holding section s2. A difference between the two durations of the first voltage holding section corresponding to the two bottom values is output as a natural period Tc of liquid in the pressure generating chamber 52.

The embodiments of the invention have been described. The invention can be implemented in various forms within the scope of the invention. The constructions described in connection with, e.g., the fourth through tenth embodiments, may be combined with the constructions that have been described in connection with the second and third embodiments wherein the velocity of an ejected liquid is derived on the basis of at least two light-receiving states.

The liquid injection device is not limited to a color printer and may be embodied as a monochrome printer. Alternatively, the liquid injection device may be a coloring material injection device to be used for manufacturing a color filter of a liquid-crystal display, an organic EL display, an electrode material injection device to be used for manufacturing electrodes such as FEDs, or a bio-organic substance injection device to be used for manufacturing biochips. A glue or nail polish as well as ink may be used as liquid.

What is claimed is:

1. An apparatus for measuring a natural period of liquid in a pressure chamber formed in a head device which is provided with a nozzle orifice communicated with the pressure chamber and an actuator which varies pressure of the liquid contained in the pressure chamber, the apparatus comprising:

a driver, which generates a plurality of drive signals, each of which drives the actuator to eject a liquid droplet from the nozzle orifice under a condition different from the conditions established by the other drive signals;

a light emitter, which emits a light beam so as to intersect a space through which the liquid droplet passes;

a light receiver, which receives the light beam which has been passed through the space;

a first calculator, which calculates an ejection velocity of the liquid droplet based on a timing at which the actuator is driven and a change in a photo-receiving state of the light receiver, with regard to every drive signal; and a second calculator, which calculates the natural period based on a change in the ejection velocity which is obtained from the plural drive signals, wherein;

each of the drive signals has a first waveform element which decompresses the pressure chamber, a second waveform element which holds a decompressed state of the pressure chamber, and a third waveform element which compress the pressure chamber;

each condition is defined by varying a duration of the second waveform element;

each condition is determined such that the change the ejection velocity has at least two peak values; and the natural period is determined as a time period represented by an interval-of the peak values.

2. The apparatus as set forth in claim 1, wherein the change in the photo-receiving state is so configured that a reception of the light beam in the light receiver is interrupted when the liquid droplets intersects the light beam.

3. The apparatus as set forth in claim 2, wherein the light receiver generates a pulse signal having a pulse width corresponding to a time period during which the reception of the light beam is interrupted.

4. The apparatus as set forth in claim 3, wherein the first calculator calculates the ejection velocity based on the timing at which the actuator is driven and a timing of an initial edge of the pulse signal.

5. The apparatus as set forth in claim 3, wherein the first calculator calculates the ejection velocity based on the timing at which the actuator is driven and a timing of a center portion the pulse width.

6. The apparatus as set forth in claim 1, further comprising a position adjuster, which adjusts a distance between the nozzle orifice and the light beam.

7. The apparatus as set forth in claim 6, wherein:
the position adjuster provides a first distance and a second distance;
the driver drives the actuator each of when the first distance is provided and when the second distance is provided; and
the first calculator calculates the ejection velocity based on a change in a photo-receiving state of the light receiver when the first distance is provided and a change in a photo-receiving state of the light receiver when the second distance is provided.

8. The apparatus as set forth in claim 1, further comprising a shutter disposed between the light emitter and the space to prevent liquid mist from going to the light emitter.

9. The apparatus as set forth in claim 1, further comprising a shutter disposed between the light receiver and the space to prevent liquid mist from going to the light receiver.

10. The apparatus as set forth in claim 1, wherein the light emitter is provided with a semiconductor laser.

11. The apparatus as set forth in claim 1, wherein the light receiver is provided with a photo diode.

12. The apparatus as set forth in claim 1, wherein:
the light emitter includes a first light emitter, which emits a first light beam so as to intersect a first space which is away from the nozzle orifice at a first distance, and a second light emitter, which emits a second light beam so as to intersect a second space which is away from the nozzle orifice at a second distance;
the light receiver includes a first light receiver, which receives the first light beam which has been passed through the first space, and a second light receiver, which receives the second light beam which has been passed through the second space; and
the first calculator calculates the ejection velocity based on a change in a photo-receiving state of the first light receiver and a change in a photo-receiving state of the second light receiver.

13. The apparatus as set forth in claim 1, wherein the liquid is ink containing a coloring material.

14. The apparatus as set forth in claim 3, wherein the first calculator calculates the ejection velocity based on the pulse width of the pulse signal.

15. The apparatus as set forth in claim 14, wherein the first calculator calculates the ejection velocity based on a pulse signal having the largest pulse width among pulse signals obtained within a predetermined time period.

16. The apparatus as set forth in claim 1, wherein a duration of the first waveform element is a half of a natural period which is previously derived in connection with the liquid and the pressure chamber.

17. The apparatus as set forth in claim 1, wherein a duration of the third waveform element is a half of a natural period which is previously derived in connection with the liquid and the pressure chamber.

18. An apparatus for measuring a natural period of liquid in a pressure chamber formed in a head device which is provided with a nozzle orifice communicated with the pressure chamber and an actuator which varies pressure of the liquid contained in the pressure chamber, the apparatus comprising:
a driver, which generates a plurality of drive signals, each of which drives the actuator to eject a liquid droplet from the nozzle orifice under a condition different from the conditions established by the other drive signals;
a light emitter, which emits a light beam so as to intersect a space through which the liquid droplet passes:
a light receiver, which receives the light beam which has been passed, through the space;
a first calculator, which calculates an ejection velocity of the liquid droplet based on a timing at which the actuator is driven and a change in a photo-receiving state of the light receiver, with regard to every drive signal;
a second calculator, which calculates the natural period based on a change in the ejection velocity which is obtained from the plural drive signals;
a comparator, which compares the natural period calculated by the second calculator with a natural period value which is previously derived in connection with the liquid and the pressure chamber; and
a signal corrector, which corrects the respective drive signals, when a difference between the calculated natural period and the natural period value is greater than a predetermined value, so as to reduce the difference.

19. An apparatus for measuring a natural period of liquid in a pressure chamber formed in a head device which is provided with a nozzle orifice communicated with the pressure chamber and an actuator which varies pressure of the liquid contained in the pressure chamber, the apparatus comprising:
a driver, which generates a plurality of drive signals, each of which drives the actuator to eject a liquid droplet from the nozzle orifice under a condition different from the conditions established by the other drive signals;
a light emitter, which emits a light beam so as to intersect a space through which the liquid droplet passes;
a light receiver, which receives the light beam which has been passed through the space;
a first calculator, which calculates a time period until the liquid droplet intersects the light beam since the liquid droplet is ejected, based on a timing at which the actuator is driven and a change in a photo-receiving state of the light receiver, with regard to every drive signal; and
a second calculator, which calculates the natural period based on a change in the time period which is obtained from the plural drive signals, wherein
each of the drive signals has a first waveform element which decompresses the pressure chamber, a second waveform element which holds a decompressed state of the pressure chamber, and a third waveform element which compress the pressure chamber;

each condition is defined by varying a duration of the second waveform element;

each condition is determined such that the change in the time period has at least two bottom values; and the natural period is determined as a time period represented by an interval of the bottom values.

20. An apparatus for measuring a natural period of liquid in a pressure chamber formed in a head device which is provided with a nozzle orifice communicated with the pressure chamber and an actuator which varies pressure of the liquid contained in the pressure chamber, the apparatus comprising:

a driver, which generates a plurality of drive signals, each of which drives the actuator to eject a liquid droplet from the nozzle orifice under a condition different from the conditions established by the other drive signals;

a light emitter, which emits a light beam so as to intersect a space through which the liquid droplet passes;

a light receiver, which receives the light beam which has been passed through the space;

a first calculator, which calculates a time period from when the liquid droplet starts intersecting the light beam until the liquid droplet finishes intersecting the light beam, with regard to every drive signal; and a second calculator, which calculates the natural period based on a change in the time period which is obtained from the plural drive signals.

21. The apparatus as set forth in claim 20, wherein each condition is determined such that the change in the time period has at least two peak values.

22. The apparatus as set forth in claim 21, wherein the natural period is determined as a time period represented by an interval of the peak values.

23. A method of measuring a natural period of liquid in a pressure chamber formed in a head device, comprising the steps of:

providing a head device provided with a pressure chamber communicated with a nozzle orifice and an actuator which varies pressure of liquid contained in the pressure chamber;

providing a first light emitter and a first light receiver;

emitting a first light beam from the first light emitter so as to intersect a first space between the first light emitter and the first light receiver;

receiving the first light beam which has been passed through the first space by the first light receiver;

generating a plurality of drive signals, each of which drives the actuator to eject a liquid droplet from the nozzle orifice under a condition different from the conditions established by the other drive signals;

calculating an ejection velocity of the liquid droplet, with regard to every drive signal, based on a timing at which the actuator is driven and a change in a photo-receiving state of the first light receiver caused by the ejected liquid droplet passes through the first light beam; and calculating the natural period based on a change in the ejection velocity which is obtained from the plural drive signals, wherein each of the drive signals has a first waveform element which decompresses the pressure chamber, a second waveform element which holds a decompressed state of the pressure chamber, and a third waveform element which compress the pressure chamber;

each condition is defined by varying a duration of the second waveform element;

each condition is determined such that the change in the ejection velocity has at least two peak values; and, the natural period is determined as a time period represented by an interval of the peak values.

24. The method as set forth in claim 23, further comprising the step of generating a pulse signal having a pulse width corresponding to a time period during which the change in the photo-receiving state is occurred.

25. The method as set forth in claim 24, wherein the ejection velocity is calculated based on the timing at which the actuator is driven and a timing of an initial edge of the pulse signal.

26. The method as set forth in claim 24, wherein the ejection velocity is calculated based on the timing at which the actuator is driven and a timing of a center portion of the pulse width.

27. The method as set forth in claim 23, further comprising the steps of positioning the head device such that a distance between the nozzle orifice and the first light beam becomes a first distance and a second distance, wherein:

the drive signal is generated both of when the distance is the first distance and when the distance is the second distance; and the ejection velocity is calculated both of when the distance is the first distance and when the distance is the second distance.

28. The method as set forth in claim 23, further comprising the steps of:

providing a second light emitter and a second light receiver;

emitting a second light beam from the second light emitter so as to intersect a second space between the second light emitter and the second light receiver; and receiving the second light beam which has been passed through the second space by the second light receiver;

wherein the ejection velocity is calculated further based on a timing at which the actuator is driven and a change in a photo-receiving state of the second light receiver caused by the ejected liquid droplet passes through the second light beam.

29. The method as set forth in claim 24, wherein the ejection velocity is calculated based on the pulse width of the pulse signal.

30. The method as set forth in claim 29, further comprising the step of selecting one pulse signal having the largest pulse width among pulse signals obtained within a predetermined time period, wherein the ejection velocity is calculated based on the largest pulse width.

31. The method as set forth in claim 23, wherein a duration of the first waveform element is determined to be a half of a natural period which is previously derived in connection with the liquid and the pressure chamber.

32. The method as set forth in claim 23, wherein a duration of the third waveform element is determined to be a half of a natural period which is previously derived in connection with the liquid and the pressure chamber.

33. A method of measuring a natural period of liquid in a pressure chamber formed in a head device, comprising the steps of:

providing a head device provided with a pressure chamber communicated with a nozzle orifice and an actuator which varies pressure of liquid contained in the pressure chamber;

providing a first light emitter and a first light receiver;

emitting a first light beam from the first light emitter so as to intersect a first space between the first light emitter and the first light receiver;

receiving the first light beam which has been gassed through the first space by the first light receiver;

generating a plurality of drive signals, each of which drives the actuator to eject a liquid droplet from the nozzle orifice under a condition different from the conditions established by the other drive signals;

calculating an ejection velocity of the liquid droplet, with regard to every drive signal, based on a timing at which the actuator is driven and a change in a photo-receiving state of the first light receiver caused by the ejected liquid droplet passes through the first light beam;

calculating the natural period based on a change in the ejection velocity which is obtained from the plural drive signals;

comparing the calculated natural period with a natural period value which is previously derived in connection with the liquid and the pressure chamber; and correcting the respective drive signals when a difference between the calculated natural period and the natural period value is greater than a predetermined value, so as to reduce the difference.

34. A method of measuring a natural period of liquid in a pressure chamber formed in a head device, comprising the steps of:

providing a head device provided with a pressure chamber communicated with a nozzle orifice and an actuator which varies pressure of liquid contained in the pressure chamber;

providing a light emitter and a light receiver;

emitting a light beam from the light emitter so as to intersect a space between the light emitter and the light receiver;

receiving the light beam which has been passed through the space by the light receiver;

generating a plurality of drive signals, each of which drives the actuator to eject a liquid droplet from the nozzle orifice under a condition different from the conditions established by the other drive signals;

calculating a time period until the liquid droplet intersects the light beam since the liquid droplet is ejected, with regard to every drive signal, based on a timing at which the actuator is driven and a change in a photo-receiving state of the light receiver caused by the ejected liquid droplet passes through the light beam; and calculating the natural period based on a change in the time period which is obtained from the plural drive signal, wherein each of the drive signals has a first waveform element which decompresses the pressure chamber, a second waveform element which holds a decompressed state of the pressure chamber, and a third waveform element which compress the pressure chamber;

each condition is defined by varying a duration of the second waveform element;

each condition is determined such that the change in the time period has at least two bottom values; and the natural period is determined as a time period represented by an interval of the bottom values.

35. A method of measuring a natural period of liquid in a pressure chamber formed in a head device, comprising the steps of:

providing a head device provided with a pressure chamber communicated with a nozzle orifice and an actuator which varies pressure of liquid contained in the pressure chamber;

providing a light emitter and a light receiver, emitting a light beam from the light emitter so as to intersect a space between the light emitter and the light receiver;

receiving the light beam which has been passed through the space by the light receiver;

generating a plurality of drive signals, each of which drives the actuator to eject a liquid droplet from the nozzle orifice under a condition different from the conditions established by the other drive signals;

calculating a time period from when the liquid droplet starts intersecting the light beam until the liquid droplet finishes intersecting the light beam, with regard to every drive signal; and calculating the natural period based on a change in the time period which is obtained from the plural drive signals.

36. The method as set forth in claim 35, wherein each condition is determined such that the change in the time period has at least two peak values.

37. The method as set forth in claim 36, wherein the natural period is determined as a time period represented by an interval of the peak values.

* * * * *